(12) United States Patent
Hendry

(10) Patent No.: US 12,088,846 B2
(45) Date of Patent: Sep. 10, 2024

(54) SIGNALING-BASED IMAGE OR VIDEO CODING OF INFORMATION RELATED TO RECOVERY POINT FOR GDR

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 17/916,360

(22) PCT Filed: Mar. 30, 2021

(86) PCT No.: PCT/KR2021/003913
§ 371 (c)(1),
(2) Date: Sep. 30, 2022

(87) PCT Pub. No.: WO2021/201559
PCT Pub. Date: Oct. 7, 2021

(65) Prior Publication Data
US 2023/0156227 A1    May 18, 2023

Related U.S. Application Data

(60) Provisional application No. 63/003,799, filed on Apr. 1, 2020.

(51) Int. Cl.
*H04N 19/65* (2014.01)
*H04N 19/172* (2014.01)
(Continued)

(52) U.S. Cl.
CPC ........... *H04N 19/65* (2014.11); *H04N 19/172* (2014.11); *H04N 19/46* (2014.11); *H04N 19/70* (2014.11)

(58) Field of Classification Search
CPC ...... H04N 19/172; H04N 19/46; H04N 19/65; H04N 19/70; H04N 19/105; H04N 19/132;
(Continued)

(56) References Cited

U.S. PATENT DOCUMENTS

2014/0192897 A1*  7/2014  Wang ................. H04N 19/70
                                                           375/240.25
2022/0217386 A1*  7/2022  Wang .................. H04N 19/105
(Continued)

FOREIGN PATENT DOCUMENTS

KR    10-2015-0065762 A    6/2015
KR    10-2015-0105373 A    9/2015

OTHER PUBLICATIONS

JVET-Q0154, Joint Video Experts Team (JVET) of ITU-T SG 16 WP 3 and ISO/IEC JTC 1/SC 29/WG 11, Document: JVET-Q0154, 17th Meeting: Brussels, BE, Jan. 7-17, 2020, Title: AHG9: On picture header IRAP/GDR signalling; Status: Input document to JVET; Purpose: Proposal, Author(s): Muhammed Coban et al., (6 pages).

(Continued)

*Primary Examiner* — Kathleen M Walsh
(74) *Attorney, Agent, or Firm* — Bryan Cave Leighton Paisner LLP

(57) ABSTRACT

According to the disclosure of the present document, a recovery point picture order count (POC) for a gradual decoding refresh (GDR) picture is derived on the basis of GDR-related information, and an output for pictures related to the GDR picture is determined on the basis of the recovery point POC. The recovery point DOC can be derived on the basis of a syntax element related to the recovery point POC.

6 Claims, 18 Drawing Sheets

(51) Int. Cl.
*H04N 19/46* (2014.01)
*H04N 19/70* (2014.01)

(58) Field of Classification Search
CPC .... H04N 19/423; H04N 19/44; H04N 19/503; H04N 19/58
USPC .................................................... 375/240.26
See application file for complete search history.

(56) References Cited

U.S. PATENT DOCUMENTS

2023/0017513 A1* 1/2023 Wang .................... H04N 19/176
2023/0028609 A1* 1/2023 Wang ...................... H04N 19/30

OTHER PUBLICATIONS

JVET-Q0414-v1, Joint Video Experts Team (JVET) of ITU-T SG 16 WP 3 and ISO/IEC JTC 1/SC 29/WG 11, Document: JVET-Q0414-v1, 17th Meeting: Brussels, BE, Jan. 7-17, 2020, Title: AHG9: A fix for GDR signaling; Status: Input document to JVET; Purpose: Proposal, Author(s): Jie Chen et al., (4 pages).
JVET-Q2001-vE, Joint Video Experts Team (JVET) of ITU-T SG 16 WP 3 and ISO/IEC JTC 1/SC 29/WG 11, Document: JVET-Q2001-vE, 17th Meeting: Brussels, BE, Jan. 7-17, 2020, Title: Versatile Video Coding (Draft 8); Status: Output document approved by JVET; Purpose: Draft text of video coding specification, Author(s): Benjamin Bross et al., (514 pages).

\* cited by examiner

SIGNALING-BASED IMAGE OR VIDEO CODING OF INFORMATION RELATED TO RECOVERY POINT FOR GDR

CROSS-REFERENCE TO RELATED APPLICATIONS

This application is the National Stage filing under 35 U.S.C. of International Application No. PCT/KR2021/003913, filed Mar. 30, 2021, which claims the benefit of earlier filing date and right of priority to the U.S. Provisional Application No. 63/003,799, filed Apr. 1, 2020, the contents of which are all hereby incorporated by reference herein in their entirety.

TECHNICAL FIELD

The present technology relates to video or image coding, and for example, relates to signaling-based coding technology of recovery point-related information for GDR (gradual decoding refresh).

BACKGROUND ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

In addition, a method for improving efficiency of image/video coding is required and for this purpose, a method of effectively signaling and coding recovery point-related information for GDR (gradual decoding refresh) is required.

DISCLOSURE

Technical Problem

A technical problem of the present disclosure is to provide a method and an apparatus of improving video/image coding efficiency.

Another technical problem of the present disclosure is to provide a method and an apparatus of improving video/image coding efficiency based on GDR (gradual decoding refresh)-related information.

Another technical problem of the present disclosure is to provide a method and an apparatus of effectively defining and signaling/parsing a syntax element/information on a recovery point for a GDR picture.

Another technical problem of the present disclosure is to provide a method and an apparatus of effectively signaling/parsing a syntax element/information on a recovery point for a GDR picture through other layer.

Technical Solution

According to an embodiment of the present disclosure, a recovery point POC (picture order count) for a GDR picture may be derived based on GDR-related information and output for pictures related to a GDR picture may be determined based on the recovery point POC. The GDR-related information may include a syntax element related to a recovery point POC and the recovery point POC may be derived based on a POC of the GDR picture and a syntax element related to the recovery point POC.

In an example, a syntax element related to a recovery point POC may be a syntax element regarding a value obtained by subtracting 1 from a POC difference between a GDR picture and a recovery point picture related to the GDR picture and in this case, the recovery point POC may be derived based on a value obtained by adding 1 to a value of the syntax element.

Alternatively, in an example, a syntax element related to a recovery point POC may be a syntax element regarding an offset used to derive a recovery point POC and in this case, the recovery point POC may be derived based on a value obtained by adding 1 to a value of a syntax element regarding the offset.

According to an embodiment of the present disclosure, a video/image decoding method performed by a decoding apparatus is provided. The video/image decoding method may include a method disclosed in embodiments of the present disclosure.

According to an embodiment of the present disclosure, a decoding apparatus performing video/image decoding is provided. The decoding apparatus may perform a method disclosed in embodiments of the present disclosure.

According to an embodiment of the present disclosure, a video/image encoding method performed by an encoding apparatus is provided. The video/image encoding method may include a method disclosed in embodiments of the present disclosure.

According to an embodiment of the present disclosure, an encoding apparatus performing video/image encoding is provided. The encoding apparatus may perform a method disclosed in embodiments of the present disclosure.

According to one embodiment of the present disclosure, a computer-readable digital storage medium, in which encoded video/image information generated according to the video/image encoding method disclosed in at least one of the embodiments of the present disclosure is stored, is provided.

According to an embodiment of the present disclosure, a computer-readable digital storage medium, in which encoded information or encoded video/image information causing performing a video/image decoding method disclosed in at least one of the embodiments of the present disclosure by a decoding apparatus.

[Technical Effects]

The present disclosure may have a variety of effects. For example, according to an embodiment of the present disclosure, general image/video compression efficiency may be improved. In addition, according to an embodiment of the present disclosure, video/image coding efficiency may be improved based on GDR (gradual decoding refresh)-related information. In addition, according to an embodiment of the present disclosure, as a syntax element/information on a recovery point for a GDR picture is effectively defined and signaled/parsed, a problem may be removed which is generated because a POC of a recovery point picture is derived to be the same as a GDR picture. In addition, accordingly, an effect of clearly distinguishing a POC between a GDR picture and an IRAP picture may be obtained.

An effect which may be obtained through a specific embodiment of the present disclosure is not limited to effects listed above. For example, there may be a variety of technical effects which may be understood or derived from the present disclosure by a person having ordinary skill in the related art. Accordingly, specific effects of the present disclosure are not limited to those explicitly entered in the present disclosure and may include a variety of effects which may be understood or derived from technical characteristics of the present disclosure.

DESCRIPTION OF DIAGRAMS

FIG. 1 schematically illustrates an example of a video/image coding system to which the present disclosure is applicable.

Figure 6:
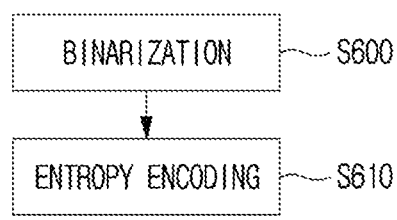
Figure 7:
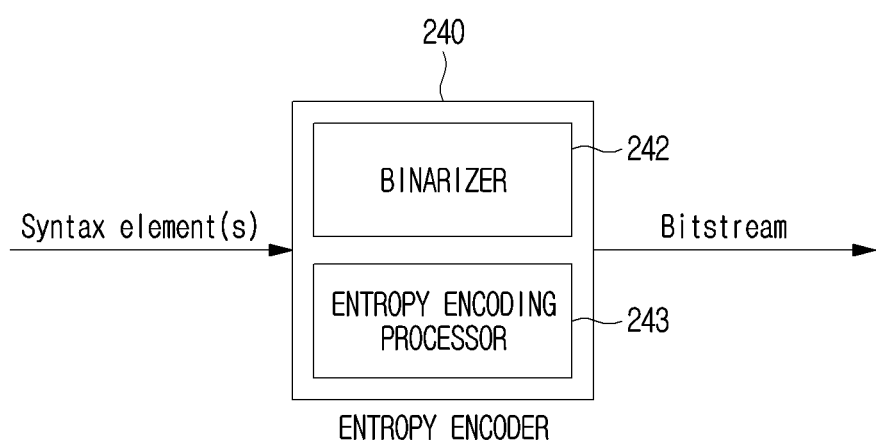

FIG. 6 schematically illustrates an example of an entropy encoding method to which embodiments of the present disclosure may be applied and FIG. 7 schematically illustrates an entropy encoder in an encoding apparatus.

Figure 8:
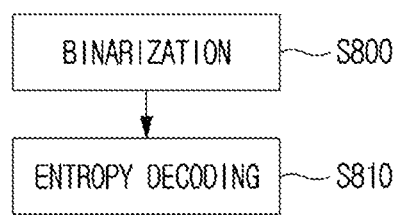
Figure 9:
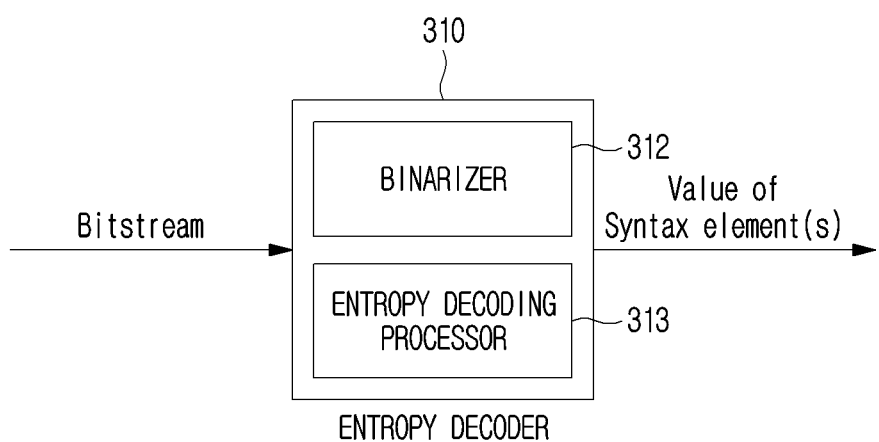

FIG. 8 schematically illustrates an example of an entropy decoding method to which embodiments of the present disclosure may be applied and FIG. 9 schematically illustrates an entropy decoder in a decoding apparatus.

Figure 10:
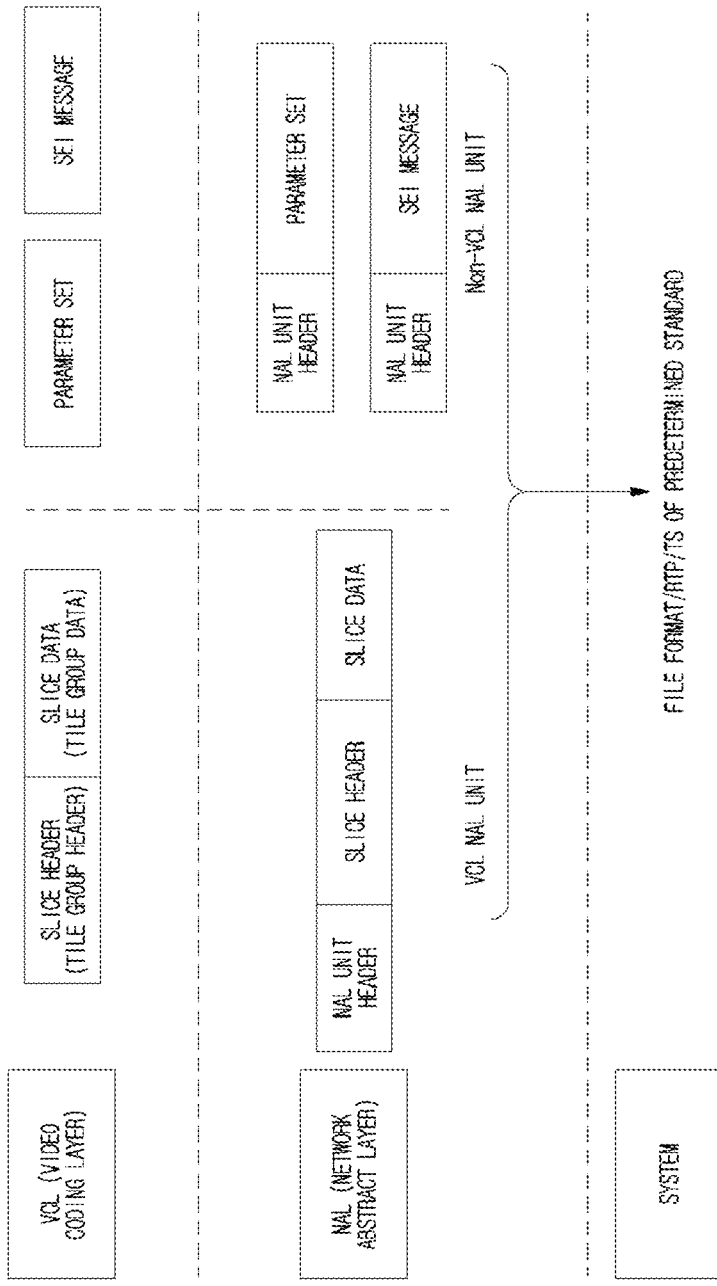

FIG. 10 exemplarily illustrates a hierarchical structure on a coded image/video.

Figure 11:
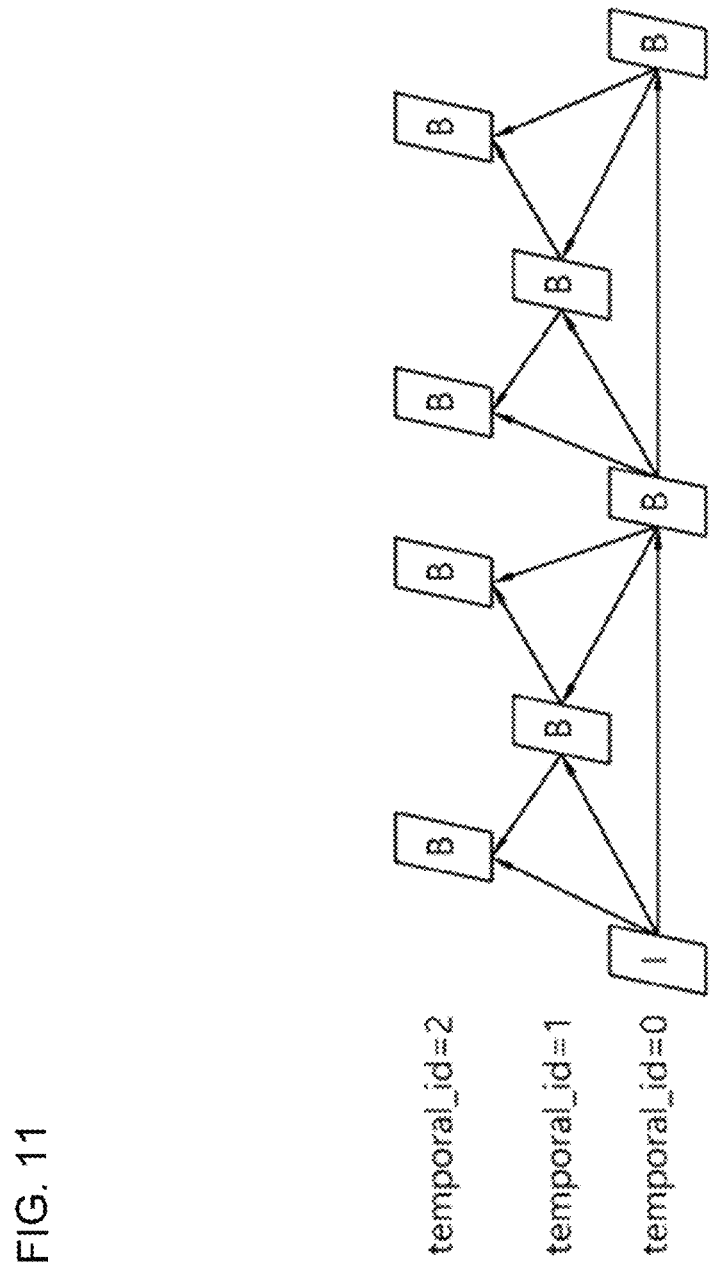

FIG. 11 is a diagram which shows a temporal layer structure for NAL units in a bitstream supporting temporal scalability.

Figure 12:
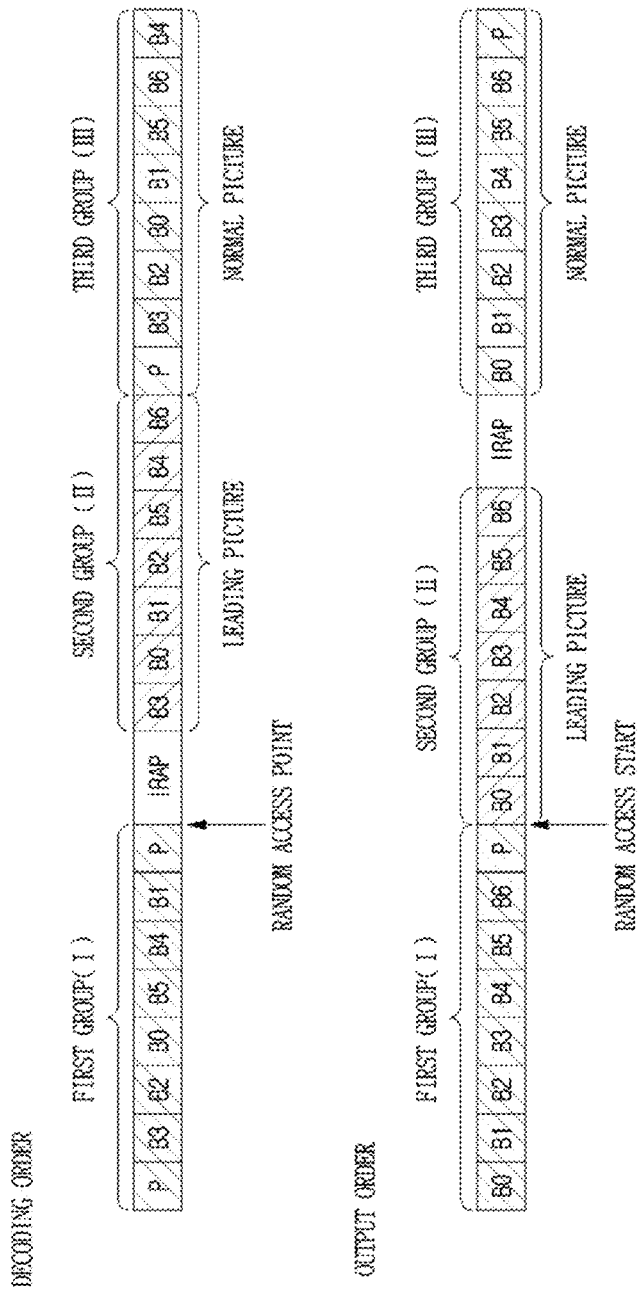

FIG. 12 is a diagram for describing a picture that random access is possible.

Figure 13:
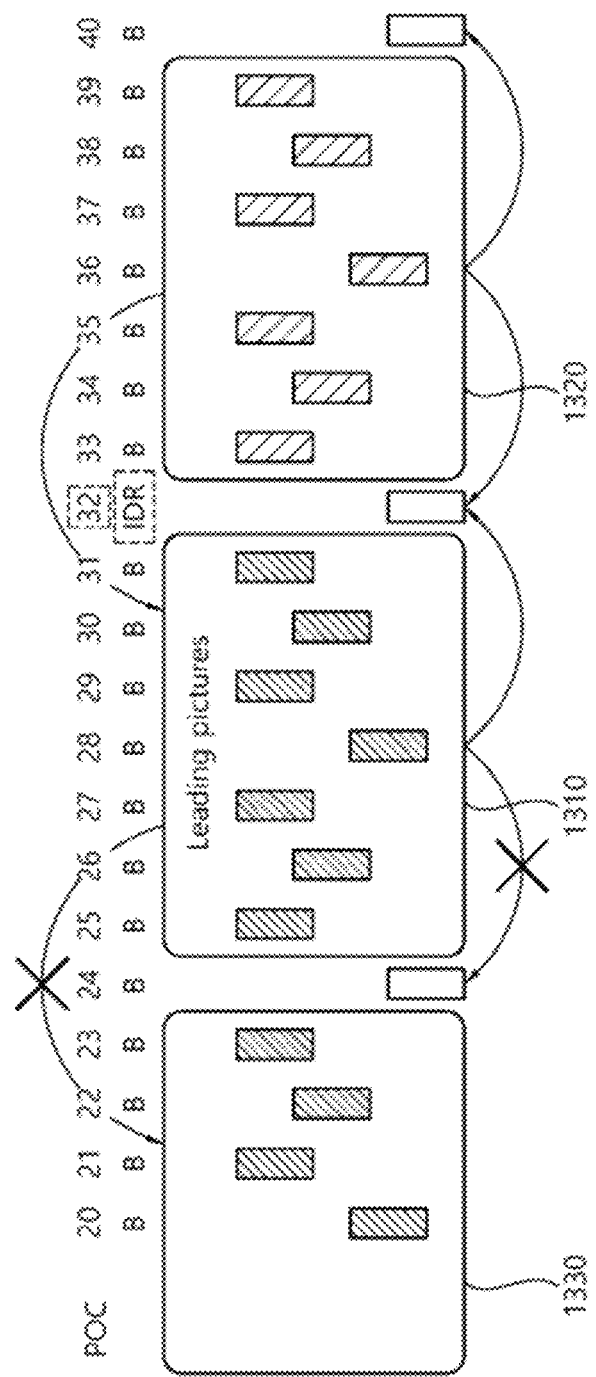

FIG. 13 is a diagram for describing an IDR picture.

Figure 14:
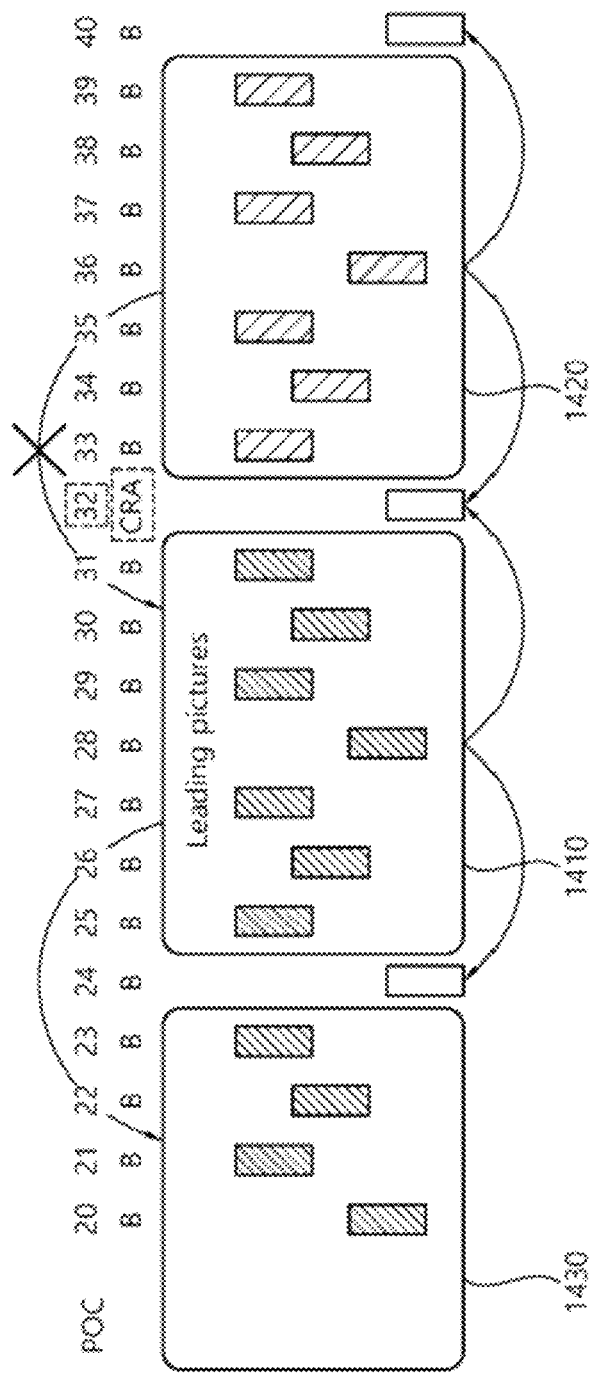

FIG. 14 is a diagram for describing a CRA picture.

Figure 15:
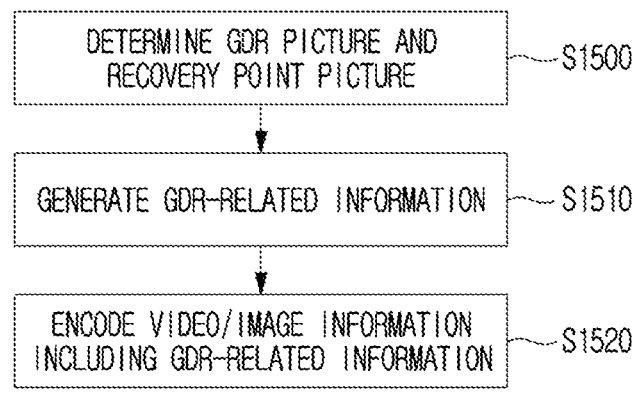

FIG. 15 schematically illustrates an example of a video/image encoding method to which embodiment(s) of the present disclosure may be applied.

Figure 16:
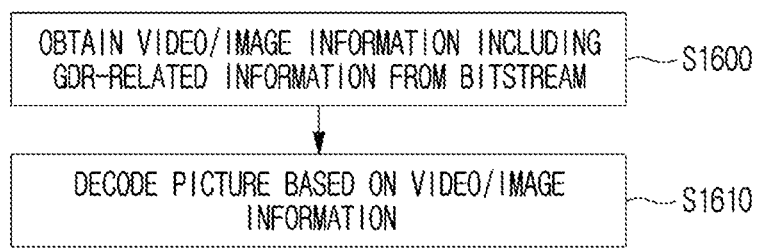

FIG. 16 schematically illustrates an example of a video/image decoding method to which embodiment(s) of the present disclosure may be applied.

Figure 17:
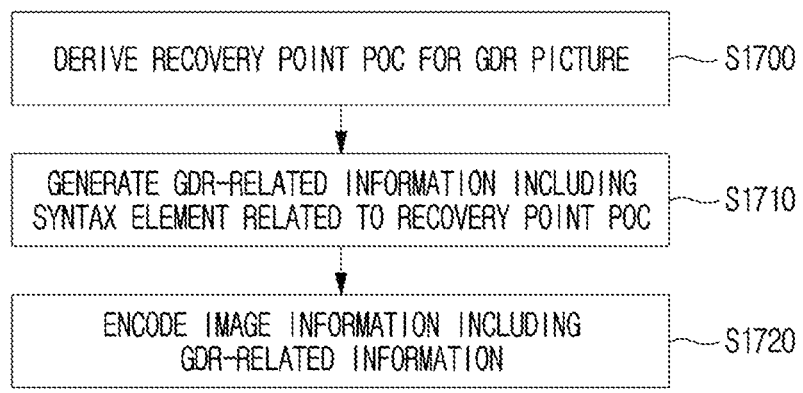
Figure 18:
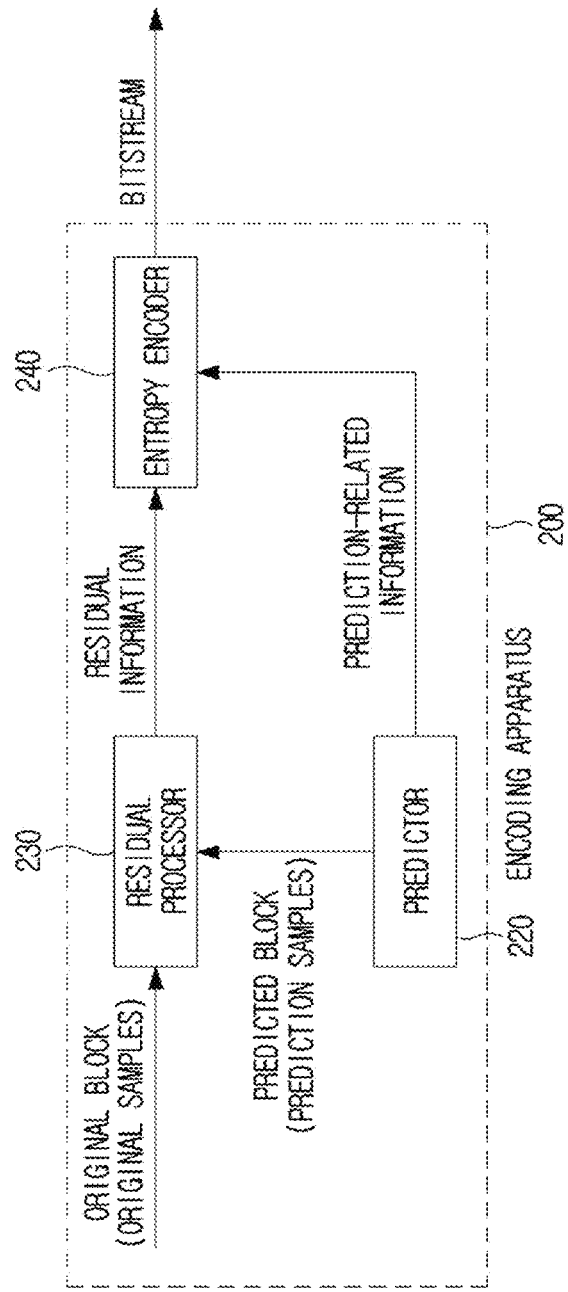

FIGS. 17 and 18 schematically illustrate examples of a video/image encoding method and related components according to embodiment(s) of the present disclosure.

Figure 19:
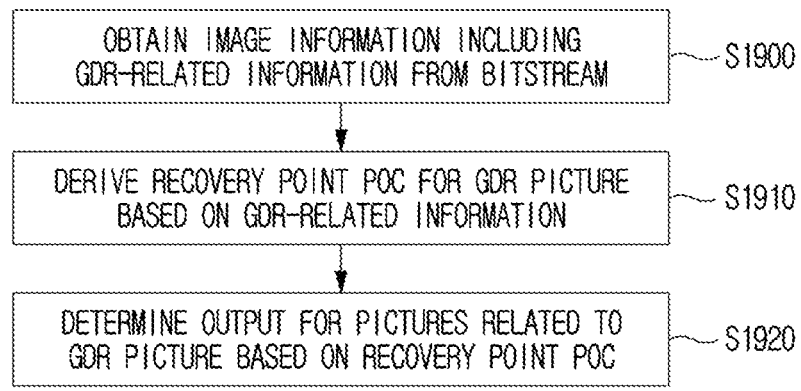
Figure 20:
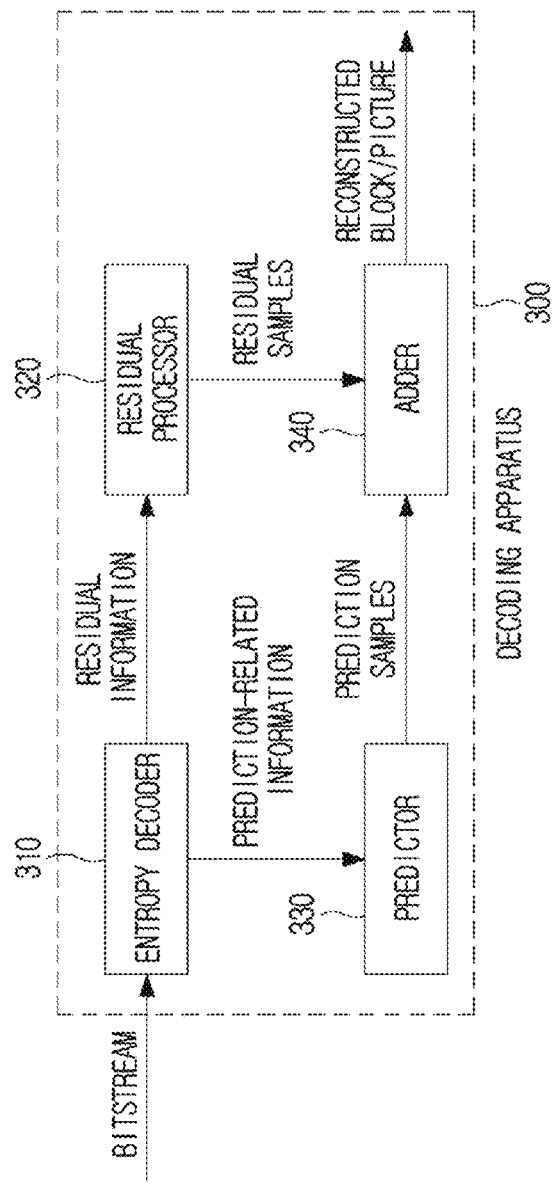

FIGS. 19 and 20 schematically illustrate examples of an image/video decoding method and related components according to an embodiment of the present disclosure.

Figure 21:
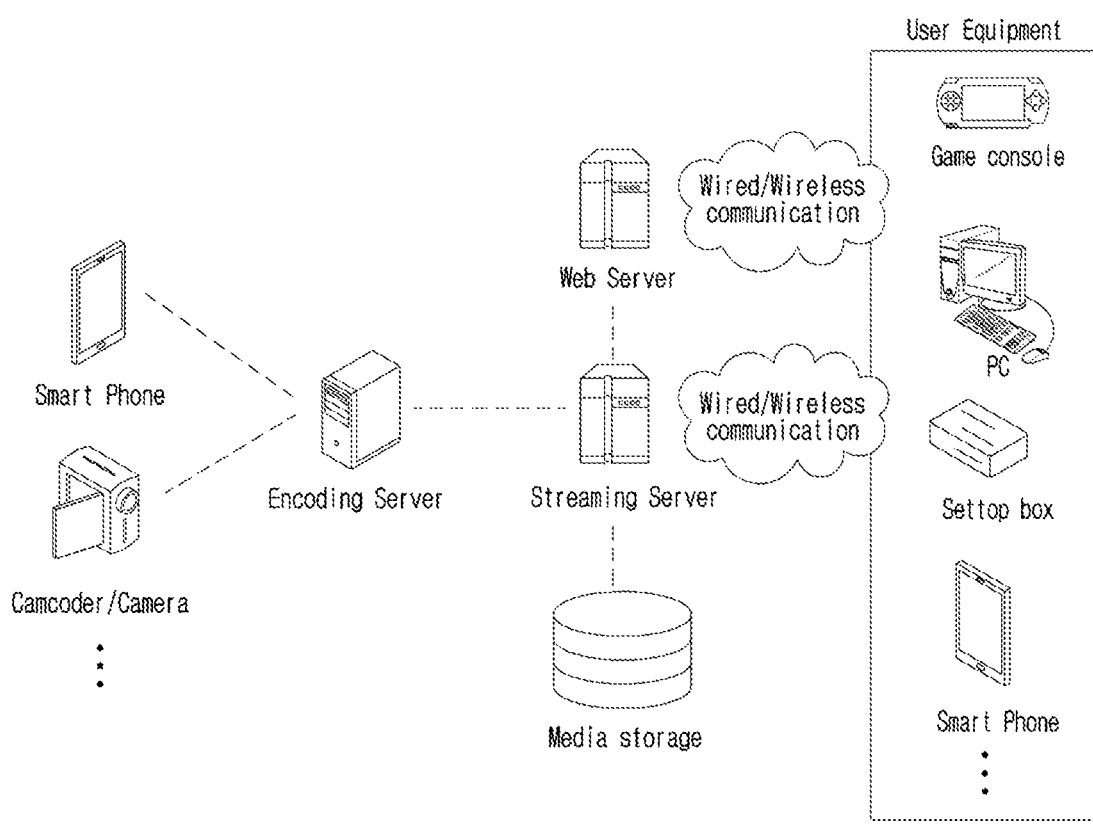

FIG. 21 illustrates an example of a content streaming system to which embodiments disclosed in the present disclosure is applicable.

BEST MODE

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

In the present disclosure, "A or B" may mean "only A", "only B" or "both A and B". In other words, "A or B" in the present disclosure may be interpreted as "A and/or B". For example, in the present disclosure, "A, B or C" means "only A", "only B", "only C", or "any combination of A, B and C".

A slash (/) or comma(,) used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

The present disclosure is related to video/image coding. For example, a method/embodiment disclosed in the present disclosure may be applied to a method disclosed in a versatile video coding (VVC) standard. In addition, the method/embodiment disclosed in the present disclosure may be applied to a method disclosed in the essential video coding (EVC) standard, the AOMedia Video 1 (AV1) standard, the 2nd generation of audio video coding standard (AVS2), or a next-generation video/video coding standard (e.g., H.267 or H.268, etc.).

In the present disclosure, a variety of embodiments relating to video/image coding may be provided, and, unless specified to the contrary, the embodiments may be combined to each other and be performed.

In the present disclosure, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. A file is a rectangular region of CTUs within a specific tile column and a specific tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture, CTUs in a tile are ordered consecutively in a CTU raster scan, and tiles in a picture are ordered consecutively in a raster scan of the tiles of the picture. A slice may include an integer number of complete tiles or an integer number of consecutive complete CTU rows within a tile of a picture that may be exclusively contained in a single NAL unit.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may mean a pixel value in the spatial domain, and when such a pixel value is transformed into the frequency domain, it may mean a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be referred to as a coefficient or a residual coefficient, or a transform coefficient for uniformity of expression.

Also, in the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) for the transform coefficients. Residual samples may be derived based on an inverse transform (transform) for the scaled transform coefficients. This may be applied/expressed in other parts of the present disclosure as well.

Technical features individually described in one figure in the present disclosure may be individually implemented or may be simultaneously implemented.

Hereinafter, preferred embodiments of the present disclosure will be explained in more detail while referring to the attached drawings. In addition, the same reference signs may be used for the same components on the drawings, and repeated descriptions for the same components may be omitted.

Figure 1:
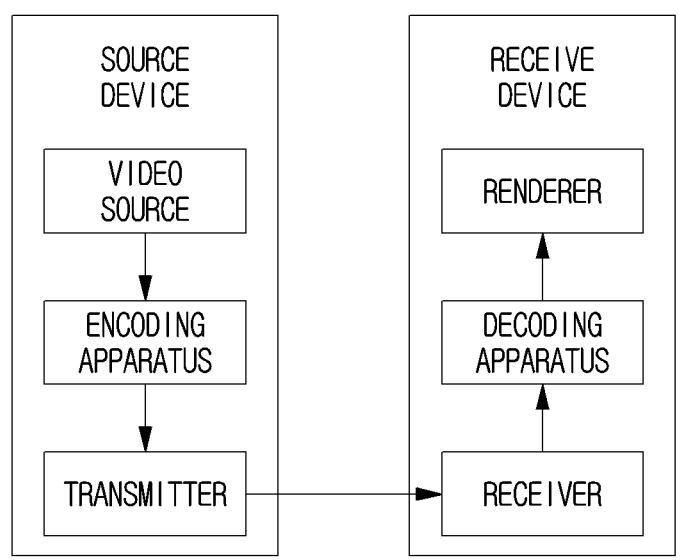

FIG. 1 schematically illustrates an example of a video/image coding system to which embodiments of the present disclosure are applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded image/video information) may be output in the form of a bitstream.

The transmitter may transmit the encoded image/video information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/ extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
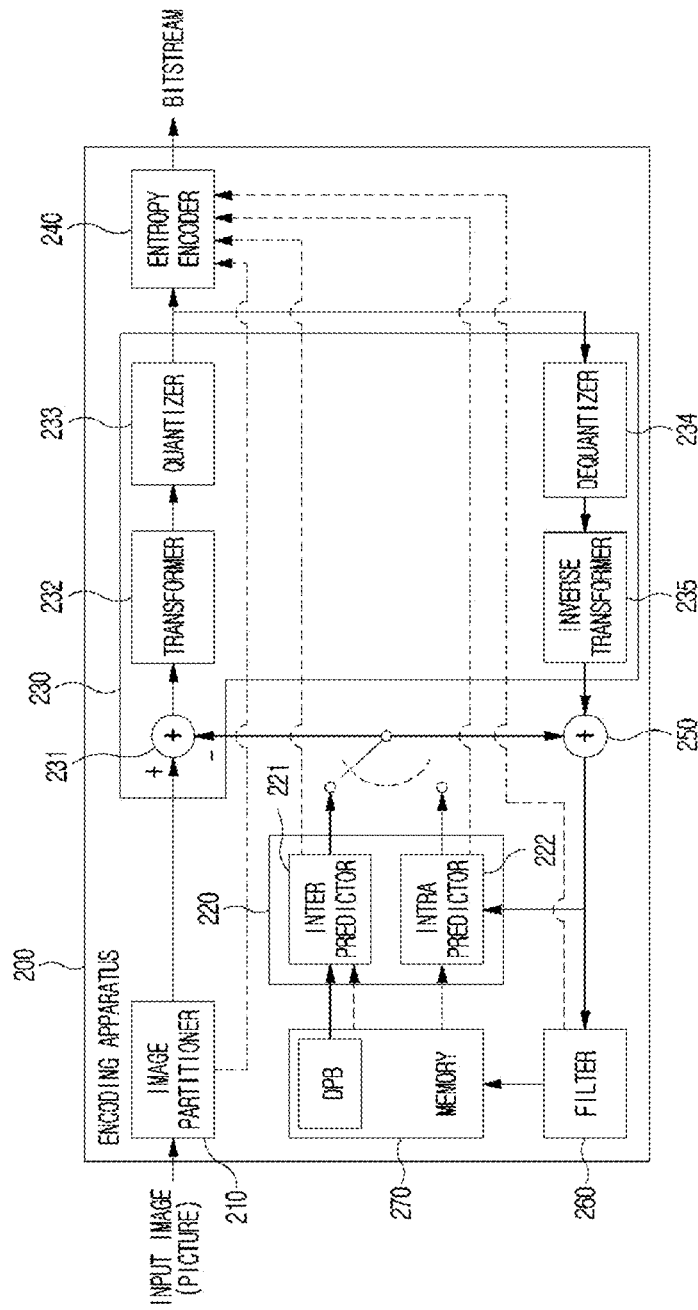
FIG. 2 is a diagram schematically illustrating a configuration of a video/image encoding apparatus to which the present disclosure is applicable.

FIG. 2 is a diagram schematically illustrating a configuration of a video/image encoding apparatus to which embodiments of the present disclosure are applicable. Hereinafter, what is referred to as the encoding apparatus may include an image encoding apparatus and/or a video encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The encoding apparatus 200 subtracts the prediction signal (predicted block, prediction sample array) output from the inter predictor 221 or the intra predictor 222 from the input image signal (original block, original sample array) to generate a residual signal (residual signal, residual block, residual sample array), and the generated residual signal is transmitted to the transformer 232. In this case, as illustrated, a unit for subtracting a prediction signal (prediction block, prediction sample array) from an input image signal (original block, original sample array) in the encoder 200 may be referred to as a subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, sub-block, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure. The palette mode may be an example of intra coding or intra prediction. When the palette mode is applied, the sample value in the picture may be signaled based on information on the palette table and the palette index.

The prediction signal generated through the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), Karhunen-Loeve Transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded image/video information) may be transmitted or stored on a unit basis of a network abstraction layer (NAL) in the form of a bitstream. The image/video information may further include information on various parameter sets such as an adaptation parameter set (APS), a picture parameter set (PPS), a sequence parameter set (SPS), a video parameter set (VPS) or the like. Further, the image/video information may further include general constraint information. In the present disclosure, information and/or syntax elements which are transmitted/signaled to the decoding apparatus from the encoding apparatus may be included in image/video information. The image/video information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 200 and the decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
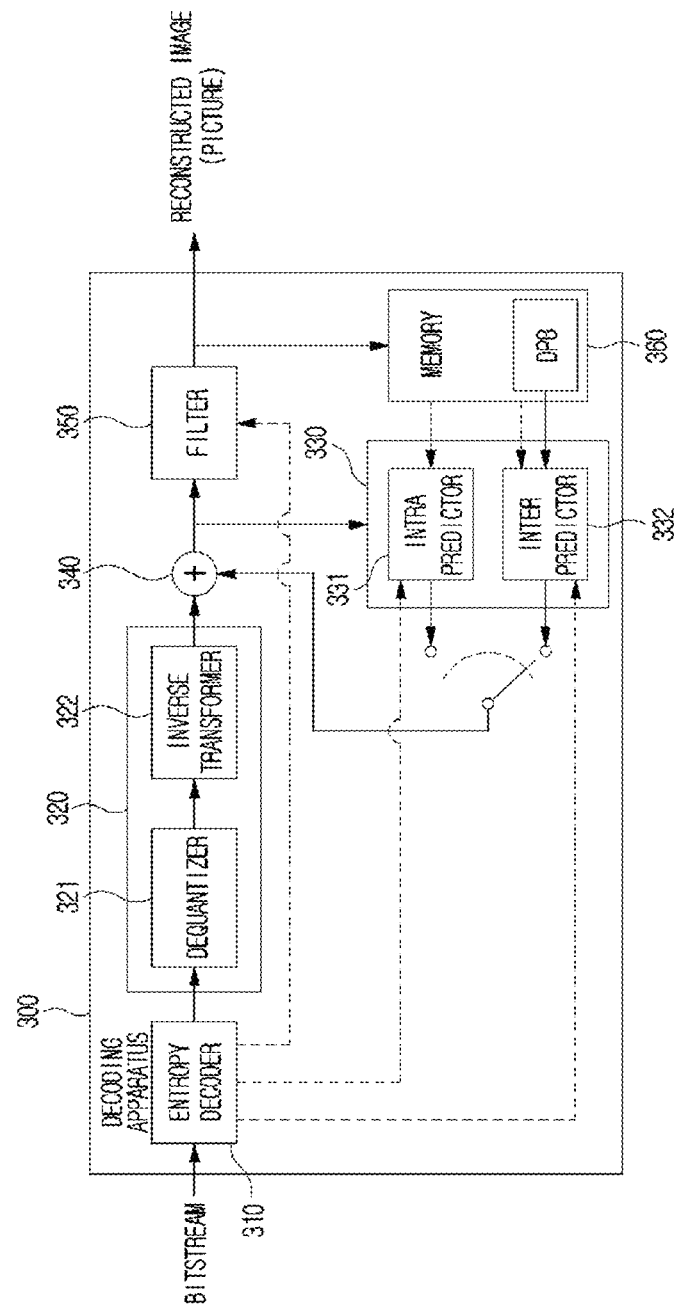
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable. Hereinafter, the decoding apparatus may include an image decoding apparatus and/or a video decoding apparatus.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including image/video information is input, the decoding apparatus 300 may reconstruct an image correspondingly to a process by which image/video information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The inverse transformer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor 320 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may be based on the intra block copy (IBC) prediction mode or the palette mode in order to predict a block. The IBC prediction mode or the palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure. The palette mode may be an example of intra coding or intra prediction. When the palette mode is applied, information on the palette table and the palette index may be signaled by being included in the image/video information.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, sub-block, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In the present disclosure, the embodiments described in the filter 260, the inter predictor 221, and the intra predictor 222 of the encoding apparatus 200 may be applied equally or correspondingly to the filter 350, the inter predictor 332, and the intra predictor 331 of the decoding apparatus 300, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Meanwhile, intra prediction or inter prediction may be applied in performing prediction for a current block as described above. In an embodiment, when inter prediction is applied to a current block, a predictor of an encoding/decoding apparatus (more specifically, an inter predictor) may derive prediction samples by performing inter prediction in a block unit. Inter prediction may represent prediction which is derived by a method dependent on data elements of picture(s) other than a current picture (e.g., sample values, or motion information, etc.). When inter prediction is applied to a current block, a predicted block for a current block (a prediction sample array) may be derived based on a reference block specified by a motion vector in a reference picture indicated by a reference picture index (a reference sample array). In this case, motion information of a current block may be predicted in a unit of a block, a sub-block or a sample based on a correlation of motion information between a neighboring block and a current block in order to reduce the amount of motion information transmitted in an inter prediction mode. Motion information may include a motion vector and a reference picture index. Motion information may additionally include inter prediction type (L0 prediction, L1 prediction, Bi prediction, etc.) information. When inter prediction is applied, a neighboring block may include a spatial neighboring block in a current block and a temporal neighboring block in a reference picture. A reference picture including the reference block may be the same as or different from a reference picture including the temporal neighboring block. The temporal neighboring block may be referred to as a collocated reference block, a collocated CU (colCU), etc. and a reference picture including the temporal neighboring block may be referred to as a collocated picture (colPic). For example, a motion information candidate list may be configured based on neighboring blocks of a current block and flag or index information indicating which candidate is selected (used) to derive a motion vector and/or a reference picture index of a current block may be signaled. Inter prediction may be performed based on a variety of prediction modes and for example, for a skip mode and a merge mode, motion information of a current block may be the same as motion information of a selected neighboring block. For a skip mode, unlike a merge mode, a residual signal may not be transmitted. For a motion information prediction (motion vector prediction, MVP) mode, a motion vector of a selected neighboring block may be used as a motion vector predictor and a motion vector difference may be signaled. In this case, a motion vector of a current block may be derived by using a sum of the motion vector predictor and the motion vector difference.

The motion information may include L0 motion information and/or L1 motion information according to an inter prediction type (L0 prediction, L1 prediction, Bi prediction, etc.). A motion vector in a L0 direction may be referred to as a L0 motion vector or MVL0 and a motion vector in a L1 direction may be referred to as a L1 motion vector or MVL1. Prediction based on a L0 motion vector may be referred to as L0 prediction, prediction based on a L1 motion vector may be referred to as L1 prediction and prediction based on both a L0 motion vector and a L1 motion vector may be referred to as Bi prediction. Here, a L0 motion vector may represent a motion vector associated with reference picture list L0 (L0) and a L1 motion vector may represent a motion vector associated with reference picture list L1 (L1). Reference picture list L0 may include pictures which are earlier than a current picture in output order as reference pictures and reference picture list L1 may include pictures which are later than a current picture in output order. Previous pictures may be referred to as a forward (reference) picture and subsequent pictures may be referred to as a backward (reference) picture. Reference picture list L0 may additionally include pictures which are later than a current picture in output order as reference pictures. In this case, in reference picture list L0, previous pictures may be indexed first and subsequent pictures may be indexed later. Reference picture list L1 may additionally include pictures which are earlier than a current picture in output order as reference pictures. In this case, in reference picture list L1, subsequent pictures may be indexed first and previous pictures may be indexed later. Here, output order may correspond to POC (picture order count) order.

Figure 4:
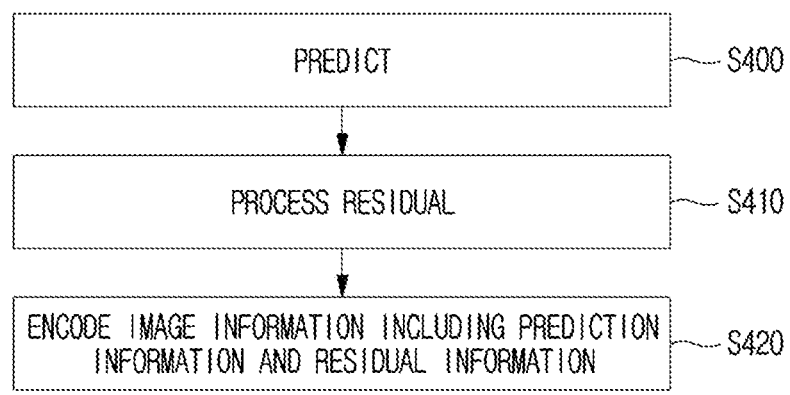
FIG. 4 illustrates an example of a schematic video/image encoding procedure to which embodiment(s) of the present disclosure may be applied.

FIG. 4 represents an example of a schematic video/image encoding procedure to which embodiment(s) of the present disclosure may be applied. In FIG. 4, S400 may be performed in a predictor 220 of an encoding apparatus described above in FIG. 2, S410 may be performed in a residual processor 230 and S420 may be performed in an entropy encoder 240. S400 may include an inter/intra prediction procedure described in the present disclosure, S410 may include a residual processing procedure described in the present disclosure and S420 may include an information encoding procedure described in the present disclosure.

In reference to FIG. 4, a video/image encoding procedure may include a procedure of generating a reconstructed picture for a current picture and a procedure (optional) of applying in-loop filtering to a reconstructed picture as well as a procedure of roughly encoding information for picture reconstruction (ex. prediction information, residual information, partitioning information, etc.) and outputting it in a form of a bitstream as shown in a description for FIG. 2. An encoding apparatus may derive (modified) residual samples from a quantized transform coefficient through a dequantization unit 234 and an inverse transform unit 235 and generate a reconstructed picture based on prediction samples which are output of S400 and the (modified) residual samples. A reconstructed picture generated in this way may be the same as a reconstructed picture generated in the above-described decoding apparatus. A modified reconstructed picture may be generated through an in-loop filtering procedure for the reconstructed picture, which may be stored in a decoded picture buffer or a memory 270 and as in a case for a decoding apparatus, may be used as a reference picture in an inter prediction procedure in encoding a picture. As described above, in some cases, all or part of the in-loop filtering procedure may be omitted. When the in-loop filtering procedure is performed, (in-loop) filtering-related information (parameter) may be encoded in an entropy encoder 240 and output in a form of a bitstream and a decoding apparatus may perform an in-loop filtering procedure in the same manner as an encoding apparatus based on the filtering-related information.

Through such an in-loop filtering procedure, a noise generated in image/video coding such as blocking artifact and ringing artifact, etc. may be reduced and subjective/objective visual quality may be improved. In addition, as an in-loop filtering procedure is performed in both an encoding apparatus and a decoding apparatus, an encoding apparatus and a decoding apparatus may derive the same prediction result, improve reliability of picture coding and reduce the amount of data which should be transmitted for picture coding.

As described above, a picture reconstruction procedure may be performed not only in a decoding apparatus, but also in an encoding apparatus. A reconstructed block may be generated based on intra prediction/inter prediction in a unit of each block and a reconstructed picture including reconstructed blocks may be generated. When a current picture/slice/tile group is I picture/slice/tile group, blocks included in the current picture/slice/tile group may be reconstructed based on intra prediction alone. Meanwhile, when a current picture/slice/tile group is P or B picture/slice/tile group, blocks included in the current picture/slice/tile group may be reconstructed based on intra prediction or inter prediction. In this case, inter prediction may be applied to some blocks in a current picture/slice/tile group and intra prediction may be applied to other blocks. A color component of a picture may include a luma component and a chroma component and unless explicitly limited in the present disclosure, methods and embodiments proposed in the present disclosure may be applied to a luma component and a chroma component.

Figure 5:
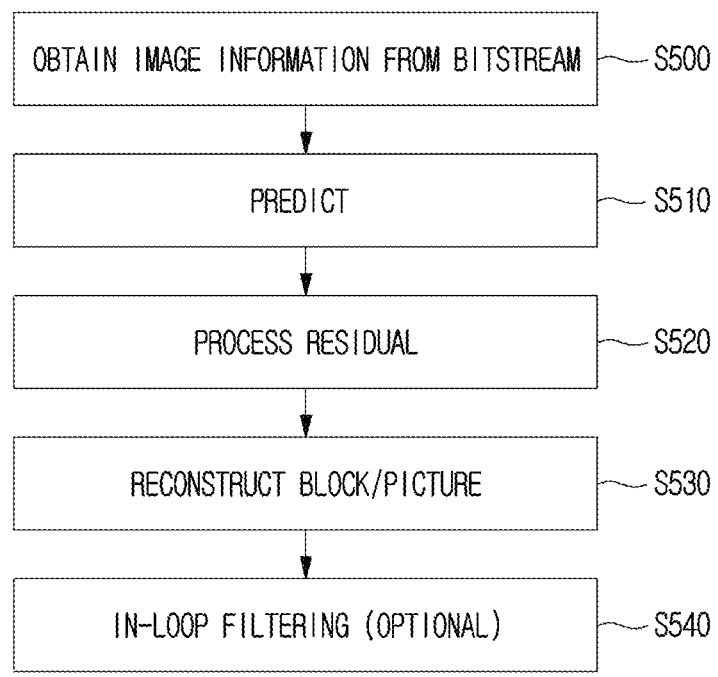
FIG. 5 illustrates an example of a schematic video/image decoding procedure to which embodiment(s) of the present disclosure may be applied.

FIG. 5 illustrates an example of a schematic video/image decoding procedure to which embodiment(s) of the present disclosure may be applied. In FIG. 5, S500 may be performed in an entropy decoder 310 of a decoding apparatus described above in FIG. 3, S510 may be performed in a predictor 330, S520 may be performed in a residual processor 320, S530 may be performed in an adder 340 and S540 may be performed in a filter 350. S500 may include an information decoding procedure described in the present disclosure, S510 may include an inter/intra prediction procedure described in the present disclosure, S520 may include a residual processing procedure described in the present disclosure, S530 may include a block/picture reconstruction procedure described in the present disclosure and S540 may include an in-loop filtering procedure described in the present disclosure.

In reference to FIG. 5, a picture decoding procedure may roughly include a procedure of obtaining image/video information (through decoding) from a bitstream S500, a picture reconstruction procedure S510~S530 and an in-loop filtering procedure for a reconstructed picture S540 as shown in a description for FIG. 3. The picture reconstruction procedure may be performed based on residual samples and prediction samples obtained through a process of inter/intra prediction S510 and residual processing (S520, dequantization for a quantized transform coefficient, inverse transform) described in the present disclosure. A modified reconstructed picture may be generated through an in-loop filtering procedure for a reconstructed picture generated through the picture reconstruction procedure and the modified reconstructed picture may be output as a decoded picture and in addition, may be stored in a decoded picture buffer or a memory 360 in a decoding apparatus and used as a reference picture in an inter prediction procedure in decoding a picture.

In some cases, the in-loop filtering procedure may be omitted and in this case, the reconstructed picture may be output as a decoded picture and in addition, may be stored in a decoded picture buffer or a memory 360 in a decoding apparatus and used as a reference picture in an inter prediction procedure in decoding a picture. The in-loop filtering procedure S540, as described above, may include a deblocking filtering procedure, a SAO (sample adaptive offset) procedure, an ALF (adaptive loop filter) procedure and/or a bi-lateral filter procedure, etc. and all or part of them may be omitted. In addition, one or part of the deblocking filtering procedure, the SAO (sample adaptive offset) procedure, the ALF (adaptive loop filter) procedure and the bi-lateral filter procedure may be sequentially applied or all of them may be sequentially applied. For example, a SAO procedure may be performed after a deblocking filtering procedure is applied to a reconstructed picture. Alternatively, for example, an ALF procedure may be performed after a deblocking filtering procedure is applied to a reconstructed picture. It may be also performed in an encoding apparatus.

Meanwhile, as described above, an encoding apparatus may perform entropy encoding based on a variety of encoding methods such as Exponential Golomb, CAVLC (Context-Adaptive Variable Length Coding), CABAC (Context-Adaptive Binary Arithmetic Coding), etc. In addition, a decoding apparatus may perform entropy decoding based on a coding method such as exponential Golomb encoding, CAVLC or CABAC, etc. Hereinafter, an entropy encoding/decoding procedure is described.

FIG. 6 schematically illustrates an example of an entropy encoding method to which embodiments of the present disclosure may be applied and FIG. 7 schematically illustrates an entropy encoder in an encoding apparatus. An entropy encoder in an encoding apparatus in FIG. 7 may be applied to be the same as or correspond to an entropy encoder 240 of an encoding apparatus 200 in FIG. 2 described above.

In reference to FIG. 6 and FIG. 7, an encoding apparatus (an entropy encoder) may perform an entropy coding procedure regarding image/video information. Image/video information may include partitioning-related information, prediction-related information (ex. inter/intra prediction division information, intra prediction mode information, inter prediction mode information, etc.), residual information, in-loop filtering-related information, etc. or may include a variety of syntax elements thereon. Entropy coding may be performed in a unit of a syntax element. S600 to S610 may be performed by an entropy encoder 240 of an encoding apparatus 200 in FIG. 2 described above.

An encoding apparatus may perform binarization for a target syntax element S600. Here, binarization may be based on a variety of binarization methods such as a Truncated Rice binarization process, a Fixed-length binarization process, etc. and a binarization method for a target syntax element may be predefined. A binarization procedure may be performed by a binarizer 242 in an entropy encoder 240.

An encoding apparatus may perform entropy encoding for a target syntax element S610. An encoding apparatus may perform regular coding based (context based) or bypass coding based encoding for a bin string of a target syntax element based on an entropy coding method including CABAC (context-adaptive arithmetic coding) or CAVLC (context-adaptive variable length coding), etc. and output thereof may be included in a bitstream. An entropy encoding procedure may be performed by an entropy encoding processor 243 in an entropy encoder 240. As described above, a bitstream may be transmitted to a decoding apparatus through a (digital) storage medium or a network.

FIG. 8 schematically illustrates an example of an entropy decoding method to which embodiments of the present disclosure may be applied and FIG. 9 schematically illustrates an entropy decoder in a decoding apparatus. An entropy decoder in a decoding apparatus in FIG. 9 may be applied to be the same as or correspond to an entropy decoder 310 of a decoding apparatus 300 in FIG. 3 described above.

In reference to FIG. 8 and FIG. 9, a decoding apparatus (an entropy decoder) may decode encoded image/video information. Image/video information may include partitioning-related information, prediction-related information (ex. inter/intra prediction division information, intra prediction mode information, inter prediction mode information, etc.), residual information, in-loop filtering-related information, etc. or may include a variety of syntax elements thereon. Entropy coding may be performed in a unit of a syntax element. S800 to S810 may be performed by an entropy decoder 310 of a decoding apparatus 300 in FIG. 3 described above.

A decoding apparatus may perform binarization for a target syntax element S800. Here, binarization may be based on a variety of binarization methods such as a Truncated Rice binarization process, a Fixed-length binarization process, etc. and a binarization method for a target syntax element may be predefined. A decoding apparatus may derive available bin strings (bin string candidates) for available values of a target syntax element through a binarization procedure. A binarization procedure may be performed by a binarizer 312 in an entropy decoder 310.

A decoding apparatus may perform entropy decoding for a target syntax element S810. A decoding apparatus compares derived bin strings with available bin strings for a corresponding syntax element, while sequentially decoding and parsing each of bins for a target syntax element from input bit(s) in a bitstream. If a derived bin string is the same as one of available bin strings, a value corresponding to a corresponding bin string may be derived as a value of a corresponding syntax element. Otherwise, the above-described procedure may be performed again after further parsing a next bit in a bitstream. Through this process, corresponding information may be signaled by using a variable length bit without using a start bit or an end bit for specific information (a specific syntax element) in a bitstream. Through it, relatively fewer bits may be allocated to a low value and general coding efficiency may be improved.

A decoding apparatus may perform context-based or bypass-based decoding for each of bins in a bin string from a bitstream based on an entropy coding method such as CABAC or CAVLC, etc. Here, a bitstream may include a variety of information for image/video decoding as described above. As described above, a bitstream may be transmitted to a decoding apparatus through a (digital) storage medium or a network.

In the present disclosure, a table including syntax elements (a syntax table) may be used to represent signaling of information from an encoding apparatus to a decoding apparatus. Order of syntax elements in a table including the syntax elements used in the present disclosure may represent parsing order of syntax elements from a bitstream. An encoding apparatus may configure and encode a syntax table so that the syntax elements can be parsed in a decoding apparatus in parsing order and a decoding apparatus may obtain a value of syntax elements by parsing and decoding syntax elements in a corresponding syntax table in parsing order from a bitstream.

FIG. 10 exemplarily illustrates a hierarchical structure on a coded image/video.

In reference to FIG. 10, a coded image/video is divided into a VCL (video coding layer) which processes image/video decoding and handles itself, a subsystem which transmits and stores encoded information and a NAL (network abstraction layer) which exists between a VCL and a subsystem and takes charge of a network adaptation function.

In a VCL, VCL data including compressed image data (slice data) may be generated or a parameter set including information on a Picture Parameter Set (PPS), a Sequence Parameter Set (SPS), a Video Parameter Set (VPS), etc. or a SEI (Supplemental Enhancement Information) message which is additionally necessary for an image decoding process may be generated.

In a NAL, a NAL unit may be generated by adding header information (a NAL unit header) to a RBSP (Raw Byte Sequence Payload) generated in a VCL. In this case, a RBSP refers to slice data, a parameter set, a SEI message, etc. generated in a VCL. NAL unit type information specified according to RBSP data included in a corresponding NAL unit may be included in a NAL unit header.

In addition, a NAL unit may be divided into a VCL NAL unit and a Non-VCL NAL unit according to a RBSP generated in a VCL. A VCL NAL unit may mean a NAL unit including information on an image (slice data) and a Non-VCL NAL unit may mean a NAL unit including information necessary for decoding an image (a parameter set or a SEI message).

A VCL NAL unit and a Non-VCL NAL unit may be transmitted through a network by adding header information according to a data standard of a subsystem. For example, a NAL unit may be transmitted through a variety of networks after being transformed in a data form of a predetermined standard such as a H.266/VVC file format, a RTP (Real-time Transport Protocol), a TS (Transport Stream), etc.

As described above, for a NAL unit, a NAL unit type may be specified according to a RBSP data structure included in a corresponding NAL unit and information on such a NAL unit type may be stored in a NAL unit header and signaled.

For example, a NAL unit may be largely classified into a VCL NAL unit type and a Non-VCL NAL unit type according to whether it includes information on an image (slice data). A VCL NAL unit type may be classified according to a characteristic and a type, etc. of a picture included by a VCL NAL unit and a Non-VCL NAL unit type may be classified according to a type, etc. of a parameter set.

The following is an example of a NAL unit type specified according to a type, etc. of a parameter set included by a Non-VCL NAL unit type.

DCI (Decoding capability information) NAL unit: A type for a NAL unit including DCI VPS (Video Parameter Set) NAL unit: A type for a NAL unit including a VPS SPS (Sequence Parameter Set) NAL unit: A type for a NAL unit including a SPS PPS (Picture Parameter Set) NAL unit: A type for a NAL unit including a PPS APS (Adaptation Parameter Set) NAL unit: A type for a NAL unit including a APS PH (Picture header) NAL unit: A type for a NAL unit including a PH The above-described NAL unit types have syntax information for a NAL unit type and the syntax information may be stored in a NAL unit header and signaled. For example, the syntax information may be nal_unit_type and NAL unit types may be specified as a value of nal_unit_type.

Meanwhile, as described above, one picture may include a plurality of slices and one slice may include a slice header and slice data. In this case, one picture header may be further added to a plurality of slices in one picture (a slice header and a slice data set). A picture header (a picture header syntax) may include information/a parameter which may be commonly applied to a picture. A slice header (a slice header syntax) may include information/a parameter which may be commonly applied to a slice. A APS (a APS syntax) or a PPS (a PPS syntax) may include information/a parameter which may be commonly applied to one or more slices or pictures. A SPS (a SPS syntax) may include information/a parameter which may be commonly applied to one or more sequences. A VPS (a VPS syntax) may include information/a parameter which may be commonly applied to multi-layers. DCI (a DCI syntax) may include information/a parameter which may be commonly applied to a video in general. DCI may include information/a parameter related to decoding capability. In the present disclosure, a high level syntax (HLS) may include at least one of the APS syntax, the PPS syntax, the SPS syntax, the VPS syntax, the DCI syntax, a picture header syntax and a slice header syntax. Meanwhile, in the present disclosure, a low level syntax (LLS), for example, may include a slice data syntax, a CTU syntax, a coding unit syntax, a transform unit syntax, etc.

Meanwhile, in the present disclosure, a tile group may be mixed or replaced with a slice or a picture. In addition, in the present disclosure, a tile group header may be mixed or replaced with a slice header or a picture header.

In the present disclosure, image/video information which is signaled in a form of a bitstream by being encoded from an encoding apparatus to a decoding apparatus may not only include partitioning-related information, intra/inter prediction information, residual information, in-loop filtering information, etc. in a picture, but also include slice header information, picture header information, APS information, PPS information, SPS information, VPS information and/or DCI information. In addition, the image/video information may further include general constraint information and/or NAL unit header information.

As described above, a HLS (High level syntax) may be coded/signaled for video/image coding. In the present disclosure, video/image information may include a HLS and a video/image coding method may be performed based on the video/image information. For example, a coded picture may be configured with one or more slices. Parameters describing a coded picture may be signaled in a picture header (PH) and parameters describing a slice may be signaled in a slice header (SH). A PH may be transmitted in its own NAL unit type. A SH may exist at a starting part of a NAL unit including a payload of a slice (i.e., slice data). Details on a syntax and a semantics of a PH and a SH may be the same as disclosed in a VVC standard. Each picture may be related to a PH. A picture may be configured with a different type of slices, an intra-coded slice (i.e., I slice) and an inter-coded slice (i.e., P-slice and B-slice). As a result, a PH may include a syntax element necessary for an intra slice of a picture and an inter slice of a picture.

Meanwhile, generally, one NAL unit type may be set for one picture. A NAL unit type may be signaled through nal_unit_type in a NAL unit header of a NAL unit including a slice. As nal_unit_type is syntax information for specifying a NAL unit type, in other words, as shown in the following Table 1, it may specify a type of a RBSP data structure included in a NAL unit.

The following Table 1 represents an example of a NAL unit type code and a NAL unit type class.

[Table 1]

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture* slice_layer_rbsp( ) | VCL |
| 8 | IDR_N_LP | | |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |

-continued

| Name of nal_unit_type | nal_unit_type | Content of NAL unit and RBSP syntax structure | NAL unit type class |
|---|---|---|---|
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

As shown in the Table 1, a name of a NAL unit type and a value thereof may be specified according to a RBSP data structure included in a NAL unit and a NAL unit may be classified into a VCL NAL unit type and a Non-VCL NAL unit type according to whether it includes information on an image (slice data). A VCL NAL unit type may be classified according to a characteristic and a type, etc. of a picture and a Non-VCL NAL unit type may be classified according to a type, etc. of a parameter set. For example, NAL unit types may be specified according to a characteristic and a type of a picture included in a VCL NAL unit as follows.

TRAIL: It represents a type for a NAL unit which includes coded slice data of a trailing picture/a sub-picture. For example, nal_unit_type may be defined as TRAIL_NUT and a value of nal_unit_type may be specified as 0.

Here, a trailing picture refers to a picture which follows a picture available for random access in output order and decoding order. A trailing picture may be a non-IRAP picture which follows an associated IRAP picture in output order and is not a STSA picture. For example, trailing pictures associated with an IRAP picture follows an IRAP picture in decoding order. Pictures which follows an associated IRAP picture in output order and precedes an associated IRAP picture in decoding order are not allowed.

STSA (Step-wise Temporal Sub-layer Access): It represents a type for a NAL unit which includes coded slice data of a STSA picture/sub-picture. For example, nal_unit_type may be defined as STSA_NUT and a value of nal_unit_type may be specified as 1.

Here, as a STSA picture is a picture that switching between temporal sub-layers may be performed in a bitstream supporting temporal scalability, it is a picture which indicates a position where upswitching may be performed from a lower sub-layer to a higher sub-layer than a lower sub-layer. A STSA picture does not use a picture in the same layer and the same TemporalId as a STSA picture for inter prediction reference. Pictures which follow a STSA picture in the same layer and the same TemporalId as a STSA picture in decoding order do not use a picture before a STSA picture in the same layer and the same TemporalId as a STSA picture in decoding order for inter prediction reference. A STSA picture enables upswitching from a lower sub-layer to a sub-layer including a STSA picture in a STSA picture. In this case, a coded picture should not belong to the lowest sub-layer. In other words, STSA pictures should always have TemporalId which is greater than 0.

RADL (random access decodable leading (picture)): It represents a type for a NAL unit which includes coded slice data of a RADL picture/sub-picture. For example, nal_unit_type may be defined as RADL_NUT and a value of nal_unit_type may be specified as 2.

Here, all RADL pictures are a leading picture. A RADL picture is not used as a reference picture for a decoding process of trailing pictures of the same associated IRAP picture. Specifically, as a RADL picture having nuh_layer_id like layerId is a picture which follows an IRAP picture associated with a RADL picture in output order, it is not used as a reference picture for a decoding process of a picture having nuh_layer_id like layerId. When field_seq_flag (i.e., sps_field_seq_flag) is 0, all RADL pictures (i.e., when there is a RADL picture) precede all non-leading pictures of the same associated IRAP picture in decoding order. Meanwhile, a leading picture refers to a picture which precedes an associated IRAP picture in output order.

RASL (random access skipped leading (picture)): It represents a type for a NAL unit which includes coded slice data of a RASL picture/sub-picture. For example, nal_unit_type may be defined as RASL_NUT and a value of nal_unit_type may be specified as 3.

Here, all RASL pictures are leading pictures of an associated CRA picture. When an associated CRA picture has NoOutputBeforeRecoveryFlag whose value is 1, a RASL picture may include reference to pictures which do not exist in a bitstream, so a RASL picture may not be exactly decoded without being output. A RASL picture is not used as a reference picture for a decoding process of a non-RASL picture of the same layer. But, a RADL sub-picture in a RASL picture of the same layer may be used for inter prediction for a collocated RADL sub-picture in a RADL picture associated with the same CRA picture as a RASL picture. When field_seq_flag (i.e., sps_field_seq_flag) is 0, all RASL pictures (i.e., when there is a RASL picture) precede all non-leading pictures of the same associated CRA picture in decoding order.

There may be nal_unit_type reserved for a non-IRAP VCL NAL unit type. For example, nal_unit_type may be defined as RSV_VCL_4 to RSV_VCL_6 and a value of nal_unit_type may be specified as 4 to 6, respectively.

Here, an IRAP (intra random access point) is information representing a NAL unit for a picture available for random access. An IRAP picture may be a CRA picture or an IDR picture. For example, an IRAP picture, as in the Table 1, refers to a picture having a NAL unit type that nal_unit_type is defined as IDR_W_RADL, IDR_N_LP, CRA_NUT and a value of nal_unit_type may be specified as 7 to 9, respectively.

An IRAP picture does not use a reference picture in the same layer for inter prediction in a decoding process. In other words, an IRAP picture does not refer to other pictures other than itself for inter prediction in a decoding process. In decoding order, a first picture in a bitstream is an IRAP or GDR picture. For a single-layer bitstream, if a necessary parameter set is available when it is needed to be referred to, all following non-RASL pictures and IRAP pictures of a CLVS (coded layer video sequence) in decoding order may be accurately decoded without performing a decoding process of a picture preceding an IRAP picture in decoding order.

A value of mixed_nalu_types_in_pic_flag for an IRAP picture is 0. When a value of mixed_nalu_types_in_pic_flag for a picture is 0, one slice in a picture may have a NAL unit type (nal_unit_type) within a range from IDR_W_RADL to CRA_NUT (e.g., in the Table 1, a value of a NAL unit type is 7 to 9) and all of other slices in a picture may have the same NAL unit type (nal_unit_type). In this case, a picture may be considered as an IRAP picture.

IDR (instantaneous decoding refresh): It represents a type for a NAL unit which includes coded slice data of an IDR picture/a sub-picture. For example, nal_unit_type for an IDR picture/a RASLRASLsub-picture may be defined as IDR_W_RADL or IDR_N_LP and a value of nal_unit_type may be specified as 7 or 8, respectively.

Here, an IDR picture may become a first picture in decoding order in a bitstream or may appear later (i.e., later, not first) in a bitstream without using inter prediction in a decoding process (i.e., without referring to other pictures other than itself for inter prediction). Each IDR picture is a first picture of a CVS (coded video sequence) in decoding order. For example, if an IDR picture has an association with a decodable leading picture, a NAL unit type of an IDR picture may be represented as IDR_W_RADL and if an IDR picture has no association with a leRASLading picture, a NAL unit type of an IDR picture may be represented as IDR_N_LP. In other words, an IDR picture that a NAL unit type is IDR_W_RADL may not have an associated RASL picture in a bitstream, but it may have an associated RADL picture in a bitstream. An IDR picture that a NAL unit type is IDR_N_LP does not have an associated leading picture in a bitstream.

CRA (clean random access): It represents a type for a NAL unit which includes coded slice data of a CRA picture/a sub-picture. For example, nal_unit_type may be defined as CRA_NUT and a value of nal_unit_type may be specified as 9.

Here, a CRA picture may become a first picture in decoding order in a bitstream or may appear later (i.e., later, not first) in a bitstream without using inter prediction in a decoding process (i.e., without referring to other pictures other than itself for inter prediction). A CRA picture may have an associated RADL or RASL picture in a bitstream. For a CRA picture that a value of NoOutputBeforeRecoveryFlag is 1, associated RASL pictures may not be output by a decoder. It is because a reference to a picture which does not exist in a bitstream may be included, so in this case, decoding may not be performed.

GDR (gradual decoding refresh): It represents a type for a NAL unit which includes coded slice data of a GDR picture/a sub-picture. For example, nal_unit_type may be defined as GDR_NUT and a value of nal_unit_type may be specified as 10.

Here, a value of pps_mixed_nalu_types_in_pic_flag for a GDR picture may be 0. When a value of pps_mixed_nalu_types_in_pic_flag for a picture is 0 and one slice in a picture has a NAL unit type of GDR_NUT, all of other slices in a picture have a value of the same NAL unit type (nal_unit_type) and in this case, a picture may become a GDR picture after receiving a first slice.

In addition, for example, NAL unit types may be specified according to a type of a parameter included in a Non-VCL NAL unit, and as shown in the Table 1, a NAL unit type (nal_unit_type) such as VPS_NUT which represents a type for a NAL unit including a video parameter set, SPS_NUT which represents a type for a NAL unit including a sequence parameter set, PPS_NUT which represents a type for a NAL unit including a picture parameter set, PH_NUT which represents a type for a NAL unit including a picture header, etc. may be included.

Meanwhile, a bitstream supporting temporal scalability (or a temporal scalable bitstreamRASL) includes information on a temporal layer scaled temporally. Information on a temporal layer may be identification information of a temporal layer specified according to temporal scalability of a NAL unit. For example, identification information of a temporal layer may use temporal_id syntax information and the temporal_id syntax information may be stored in a NAL unit header in an encoding apparatus and signaled to a decoded device. Hereinafter, in the present disclosure, a temporal layer may be referred to as a sub-layer or a temporal sub-layer or a temporal scalable layer, etc.

FIG. 11 is a diagram which shows a temporal layer structure for NAL units in a bitstream supporting temporal scalability.

When a bitstream supports temporal scalability, NAL units included in a bitstream have identification information of a temporal layer (e.g., temporal_id). In an example, a temporal layer configured with NAL units that a value of temporal_id is 0 may provide the lowest temporal scalability and a temporal layer configured with NAL units that a value of temporal_id is 2 may provide the highest temporal scalability.

In FIG. 11, a box marked with I refers to I picture and a box marked with B refers to B picture. In addition, an arrow represents a reference relationship for whether a picture refers to other picture.

As shown in FIG. 11, NAL units of a temporal layer that a value of temporal_id is 0 are reference pictures which may be referred to by NAL units of a temporal layer that a value of temporal_id is 0, 1 or 2. NAL units of a temporal layer that a value of temporal_id is 1 are reference pictures which may be referred to by NAL units of a temporal layer that a value of temporal_id is 1 or 2. NAL units of a temporal layer that a value of temporal_id is 2 may be reference pictures which may be referred to by NAL units of the same temporal layer, i.e., a temporal layer that a value of temporal_id is 2, or may be non-reference pictures which are not referred to by other pictures.

If, as shown in FIG. 11, NAL units of a temporal layer that a value of temporal_id is 2, i.e., the highest temporal layer, are a non-reference picture, such NAL units may be extracted (or removed) from a bitstream without affecting other pictures in a decoding process.

Meanwhile, an IDR and CRA type of the above-described NAL unit types are information representing a NAL unit including a picture that random access (or splicing) is possible, i.e., a RAP (Random Access Point) or IRAP (Intra Random Access Point) picture that becomes a random access point. In other words, an IRAP picture may become an IDR or CRA picture and include only I slice. In a bitstream, a first picture in decoding order becomes an IRAP picture.

If an IRAP picture (an IDR and CRA picture) is included in a bitstream, there may be a picture which precedes an IRAP picture in output order, but follows it in decoding order.RASLRASLRASLRASLRASL Such pictures are referred to as a leading picture (LP).

FIG. 12 is a diagram for describing a picture that random access is possible.

A picture that random access is possible, i.e., a RAP or IRAP picture which becomes a random access point is a first picture in decoding order in a bitstream in performing random access and includes only I slice.

In FIG. 12, output order (or display order) and decoding order of a picture are shown. As shown, output order and decoding order of a picture may be different each other. For convenience, pictures are described by being classified into predetermined groups.

Pictures belonging to a first group (I) represents a picture which precedes an IRAP picture both in output order and in decoding order and pictures belonging to a second group (II) represents a picture which precedes an IRAP picture in output order, but follows it in decoding order. Pictures in a third group (III) follows an IRAP picture both in output order and in decoding order.

Pictures in a first group (I) may be decoded and output regardless of an IRAP picture.

Pictures belonging to a second group (II) which are output before an IRAP picture are referred to as a leading picture and leading pictures may be a problem in a decoding process when an IRAP picture is used as a random access point.

A picture belonging to a third group (III) which follows an IRAP picture in output and decoding order is referred to as a normal picture. A normal picture is not used as a reference picture of a leading picture.

A random access point that random access occurs in a bitstream becomes an IRAP picture and random access starts as a first picture of a second group (II) is output.

FIG. 13 is a diagram for describing an IDR picture.

An IDR picture is a picture which becomes a random access point when a group of a picture has a closed structure. As described above, an IDR picture is an IRAP picture, so it includes only I slice, and it may be a first picture in decoding order in a bitstream or may be in the middle of a bitstream. When an IDR picture is decoded, all reference pictures stored in a DPB (decoded picture buffer) are marked with "unused for reference".

A bar shown in FIG. 13 represents a picture and an arrow represents a reference relationship for whether a picture may use other picture as a reference picture. A x mark on an arrow represents that corresponding picture(s) may not refer to a picture indicated by an arrow.

As shown, a picture that a POC is 32 is an IDR picture. Pictures that a POC is 25 to 31 and which are output before an IDR picture are leading pictures 1310. Pictures that a POC is equal to or greater than 33 correspond to a normal picture 1320.

Leading pictures 1310 preceding an IDR picture in output order may use a leading picture different from an IDR picture as a reference picture, but may not use a past picture 1330 preceding leading pictures 1310 in output order and in decoding order as a reference picture.

Normal pictures 1320 following an IDR picture in output order and in decoding order may be decoded by referring to an IDR picture, a leading picture and other normal picture.

FIG. 14 is a diagram for describing a CRA picture.

A CRA picture is a picture which becomes a random access point when a group of a picture has an open structure. As described above, a CRA picture is also an IRAP picture, so it includes only I slice, and it may be a first picture in decoding order in a bitstream or may be in the middle of a bitstream for normal play.

A bar shown in FIG. 14 represents a picture and an arrow represents a reference relationship for whether a picture may use other picture as a reference picture. A x mark on an arrow represents that a corresponding picture or pictures may not refer to a picture indicated by an arrow.

Leading pictures 1410 preceding a CRA picture in output order may use all of a CRA picture, other leading picture, and a past picture 1430 preceding leading pictures 1410 in output order and in decoding order as a reference picture.

On the other hand, normal pictures 1420 following a CRA picture in output order and in decoding order may be decoded by referring to a normal picture different from a CRA picture. Normal pictures 1420 may not use leading pictures 1410 as a reference picture.

Meanwhile, in a VVC standard, a coded picture (i.e., a current picture) may be configured to include slices in a different NAL unit type. Whether a current picture includes slices in a different NAL unit type may be represented based on a syntax element, mixed_nalu_types_in_pic_flag. For example, when a current picture includes slices in a different NAL unit type, a value of a syntax element mixed_nalu_types_in_pic_flag may be represented as 1. In this case, a current picture should refer to a PPS which includes mixed_nalu_types_in_pic_flag having a value of 1. A semantics of the flag (mixed_nalu_types_in_pic_flag) is as follows.

When a value of a syntax element mixed_nalu_types_in_pic_flag is 1, it may represent that each picture referring to a PPS has one or more VCL NAL units, VCL NAL units do not have a NAL unit type (nal_unit_type) with the same value and a picture is not an IRAP picture.

When a value of a syntax element mixed_nalu_types_in_pic_flag is 0, it may represent that each picture referring to a PPS has one or more VCL NAL units and a VCL NAL unit of each picture referring to a PPS has a NAL unit type (nal_unit_type) with the same value.

Meanwhile, in a VVC standard, a gradual decoding refresh (GDR) function is supported and for this GDR function, decoding may start from a picture that all parts of a reconstructed picture are not accurately decoded, but an accurately decoded part of a reconstructed picture may gradually increase in a subsequence picture until the whole picture is accurately decoded. A picture which may start a decoding process with a GDR function is referred to as a GDR picture and a first picture after a GDR picture that the whole picture is accurately decoded is referred to as a recovery point picture.

A GDR function may be supported through signaling as in the following Table 2. For example, if a GDR function is enabled, a flag of gdr_enabled_flag may be set as 1 in a SPS. A GDR picture may be identified as a NAL unit type and for example, when a NAL unit type is GDR_NUT, it may be specified as a GDR picture.

TABLE 2

| seq_parameter_set_rbsp( ) { | Descriptor |
|---|---|
| ... | |
| gdr_enabled_flag | u(1) |
| ... | |
| } | |

In addition, in relation to a GDR function, the same syntax elements as in the following Table 3 may be signaled in a picture header.

TABLE 3

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ... | |
|   if( gdr_or_irap_pic_flag ) | |
|     no_output_of_prior_pics_flag | u(1) |
|   if( gdr_pic_flag ) | |
|     recovery_poc_cnt | ue(v) |
|   ... | |
| } | |

The following Table 4 represents a semantics for syntax elements included in a syntax table in Table 3.

TABLE 4 gdr_or_irap_pic_flag equal to 1 specifies that the current picture is a GDR or IRAP picture.
gdr_or_irap_pic_flag equal to 0 specifies that the current picture may or may not be a GDR or IRAP picture.
gdr_pic_flag equal to 1 specifies the picture associated with the PH is a GDR picture.
gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.
  NOTE - When gdr_or_irap_pic_flag is equal to 1 and gdr_pic_flag is equal to 0,
  the picture associated with the PH is an IRAP picture.
no_output_of_prior_pics_flag affects the output of previously-decoded pictures in the DPB after the decoding of a CLVSS picture that is not the first picture in the bitstream
recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb − 1, inclusive.
When the current picture is a GDR picture, the variable RpPicOrderCntVal is derived as follows:
RpPicOrderCntVal = PicOrderCntVal + recovery_poc_cnt    (81)
NOTE 2 - When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

In addition, in performing a decoding process, one or more of the following operations may be applied to each GDR picture in a bitstream.

When a picture is a first picture of a layer in a bitstream in decoding order or a first picture of a layer following an EOS NAL unit of a layer in decoding order, a variable for the picture, NoOutputBeforeRecoveryFlag, may be set as 1.

Otherwise, when a value of HandleGdrAsCvsStartFlag, a variable for a picture, is set by using some external means which are not designated in a VVC standard, a variable HandleGdrAsCvsStartFlag may be set as a value provided by an external means and a variable NoOutputBeforeRecoveryFlag may be set to be the same as HandleGdrAsCvsStartFlag, a variable for a picture.

Otherwise, both of HandleGdrAsCvsStartFlag and NoOutputBeforeRecoveryFlag for a picture may be set as 0.

NoOutputBeforeRecoveryFlag of an IRAP or GDR picture may be referred to as NoOutputBeforeRecoveryFlag of a PU (picture unit) including an IRAP or GDR picture. For reference, for both an IRAP picture and a GDR picture, the operation is necessary to identify a CLVS and CLVSS pictures of each layer, and accordingly a CVSS AU and a CVS in a bitstream.

In addition, in performing a decoding process regarding a GDR picture, PictureOutputFlag, information representing whether a decoded/reconstructed current picture is necessary for output, may be set as follows.

If one of the following conditions is true, PictureOutputFlag is set as 0.

A current picture is a RASL picture and NoOutputBeforeRecoveryFlag of an associated IRAP picture is the same as 1.

gdr_enabled_flag is 1 and a current picture is a GDR picture that NoOutputBeforeRecoveryFlag is 1.

gdr_enabled_flag is 1, a current picture is related to a GDR picture that NoOutputBeforeRecoveryFlag is 1 and PicOrderCntVal of a current picture is smaller than RpPicOrderCntVal of an associated GDR picture.

sps_video_parameter_set_id is greater than 0, ols_mode_idc is 0 and a current AU includes picture picA which satisfies all of the following conditions.

PicA has PictureOutputFlag whose value is 1.

PicA has nuh_layer_id greater than a current picture (i.e., nuhLid).

PicA belongs to an output layer of an OLS. (i.e., OutputLayerIdInOls[TargetOlsIdx][0] is the same as nuhLid.)

sps_video_parameter_set_id is greater than 0, ols_mode_idc is 1 and ols_output_layer_flag[TargetOlsIdx][GeneralLayerIdx[nuh_layer_id] ] is the same as 0.

Otherwise, PictureOutputFlag is set to be the same as pic_output_flag.

As described above, a value of PictureOutputFlag may be derived and the following may be applied.

When PictureOutputFlag of a currently decoded picture is 1, it is marked with "needed for output" and a related variable PicLatencyCount is set as 0.

Otherwise (when PictureOutputFlag of a currently decoded picture is 0), it is marked with "not needed for output".

For example, a picture having a first POC may become a GDR picture and a picture having (a first POC+n) may become a recovery point picture. In this case, as described above, (decoded) pictures between a GDR picture and a recovery point picture may not be output and in addition, a (decoded) GDR picture may not be output, but a (decoded) recovery point picture may be output. For example, when a GDR picture is a first picture of a layer in a bitstream in decoding order or a first picture of a layer following an EOS NAL unit of a layer in decoding order, NoOutputBeforeRecoveryFlag may be set as 1.

NoOutputBeforeRecoveryFlag may represent whether decoded pictures from a GDR picture to pictures before a recovery point picture may be output in POC order or in decoding order. When gdr_enabled_flag is 1 and a current picture is a GDR picture that a value of NoOutputBeforeRecoveryFlag is 1, PictureOutputFlag may be set as 0. When gdr_enabled_flag is 1, a current picture is related to a GDR picture that a value of NoOutputBeforeRecoveryFlag is 1 and when PicOrderCntVal of a current picture is smaller than RpPicOrderCntVal of an associated GDR picture (i.e., when a current picture is a previous picture for a recovery point picture in POC order), PictureOutputFlag may be set as 0. RpPicOrderCntVal may represent a POC value of a recovery point picture.

For example, when PictureOutputFlag is 1, a (decoded) current picture is output in output order or in POC order. Alternatively, when PictureOutputFlag is 0, a (decoded) current picture is not output.

Meanwhile, in a current VVC, for signaling of a GDR function, a recovery point picture is set to follow a GDR picture both in decoding order and in output order. But, signaling of a recovery point picture has at least the following problems.

1. A value of recovery_poc_cnt may be 0 and in this case, a case may occur which makes a POC of a recovery point picture the same as an associated GDR picture. In this case, a problem may occur in which a GDR picture becomes the same as an IRAP picture. Accordingly, it causes an incorrect operation for a GDR function and a recovery point picture, so it is necessary to prevent such a case from taking place.

2. When a GDR function is enabled, a distance between a GDR picture and an associated recovery point picture may be regular and generally, there may be the minimum distance between them. It needs to be used to improve efficiency in signaling a syntax element, recovery_poc_cnt.

Here, a syntax element recovery_poc_cnt represents a recovery point of decoded pictures in output order.

In order to resolve the above-described problems, the present disclosure proposes a method of effectively signaling recovery point picture-related information in relation to a GDR function. In other words, the present disclosure proposes the following embodiments and the following embodiments may be individually applied respectively or may be applied through one or more combinations.

1. In signaling a syntax element which designates a POC difference between a GDR picture and an associated recovery point picture, a value of the syntax element is configured not to be 0. In an example, in order to prevent a value of the syntax element from being 0, it may be represented by being replaced with recovery_poc_cnt_minus1, a syntax element obtained by subtracting 1 from a syntax element recovery_poc_cnt. In other words, signaling may be performed by making a current syntax element recovery_poc_cnt a syntax element recovery_poc_cnt_minus1 having a term of "_minus1".

2. When a GDR function is enabled (i.e., when gdr_enabled_flag is 1), an offset value may be used in a process of deriving a POC of a recovery point picture. In other words, when a GDR function is enabled, an offset value may be signaled. The offset value may be a value which is added in an equation for deriving a POC of a recovery point picture.
  a) An offset may be a non-zero value.
  b) An offset may be represented as a syntax element recovery_poc_cnt_offset_minus1.
  c) An offset may be signaled in the same parameter (i.e., a SPS) that gdr_enabled_flag exists.
3. Alternatively, a syntax element, recovery_poc_cnt_offset_minus1 may be signaled in a PPS.
  a) When a GDR function is not enabled, gdr_enabled_flag may be repetitively signaled in a PPS to prevent this offset from being always signaled in a PPS and it may be used to represent a condition on whether there is a syntax element, recovery_poc_cnt_offset_minus1.

In an embodiment, in order to prevent a POC difference between a GDR picture and a recovery point picture from being 0, the present disclosure proposes a method of effectively signaling information related thereto. For example, information representing a value obtained by subtracting 1 from a POC difference between a GDR picture and a recovery point picture (i.e., a syntax element) may be signaled.

The following Table 5 represents an example on a method of signaling information representing a POC difference between a GDR picture and a recovery point picture.

|  | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ... | |
|   if( gdr_or_irap_pic_flag ) | |
|     no_output_of_prior_pics_flag | u(1) |
|   if( gdr_pic_flag ) | |
|     recovery_poc_cnt_minus1 | ue(v) |
|   ... | |
| } | |

The following Table 6 represents a semantics for a syntax element included in a syntax table in Table 5.

TABLE 6 recovery_poc_cnt_minus1 plus 1 specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt_minus1 + 1, the picture picA is referred to as the recovery point picture. Otherwise, the first picture in output order that has PicOrderCntVal greater than the PicOrderCntVal of the current picture plus the value of recovery_poc_cnt_minus1 + 1 is referred to as the recovery point picture. The recovery point picture shall not precede the current GDR picture in decoding order. The value of recovery_poc_cnt_minus1 shall be in the range of 0 to MaxPicOrderCntLsb − 2, inclusive.

TABLE 6-continued

When the current picture is a GDR picture, the variable RpPicOrderCntVal is derived as follows:
  RpPicOrderCntVal = PicOrderCntVal + recovery_poc_cnt_minus1 + 1      (81)
NOTE 2 - When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

In reference to the Table 5 and Table 6, information representing a POC difference between a GDR picture and a recovery point picture may be represented as a syntax element, recovery_poc_cnt_minus1. A syntax element, recovery_poc_cnt_minus1, may represent a recovery point of decoded pictures in output order by adding 1 to a value of the recovery_poc_cnt_minus1.

For example, when a current picture is a GDR picture related to a PH and there is picture picA following a current GDR picture in decoding order in a CLVS as a picture having the same PicOrderCntVal as what is obtained by adding a value of (recovery_poc_cnt_minus1+1) to PicOrderCntVal of a current GDR picture, picture picA may be referred to as a recovery point picture. Otherwise, as a picture having PicOrderCntVal greater than a value obtained by adding (recovery_poc_cnt_minus1+1) to PicOrderCntVal of a current picture, a first picture in output order may be referred to as a recovery point picture. A recovery point picture should not precede a current GDR picture in decoding order. A value of recovery_poc_cnt_minus1 should be within a range from 0 to (MaxPicOrderCntLsb-2).

For example, when a current picture is a GDR picture, a POC of a recovery point picture may be derived as in an equation of the Table 6 and may be represented as a variable, RpPicOrderCntVal. RpPicOrderCntVal may be derived based on (recovery_poc_cnt_minus1+1).

In addition, in an embodiment, in order to prevent a POC difference between a GDR picture and a recovery point picture from being 0, the present disclosure proposes a method of effectively signaling offset information used in a process of deriving a POC of a recovery point picture. For example, offset information may be signaled as a non-zero value. In this case, an offset may be signaled as a syntax element, recovery_poc_cnt_offset_minus1 and a syntax element, recovery_poc_cnt_offset_minus1, may be represented by subtracting 1 from an original offset value.

The following Table 7 represents an example on a method of signaling offset information used in a process of deriving a POC of a recovery point picture.

TABLE 7

| | Descriptor |
|---|---|
| seq_parameter_set_rbsp( ) { | |
| ... | |
| gdr_enabled_flag | u(1) |
| if( gdr_enabled_flag ) | |
| recovery_poc_cnt_offset_minus1 | ue(v) |
| ... | |
| } | |

The following Table 8 represents a semantics for a syntax element included in a syntax table in Table 7.

TABLE 8 recovery_poc_cnt_offset_minus1 plus 1 specifies the offset used for deriving the POC of the recovery point picture. The value of recovery_poc_cnt_offset_minus1 shall be in the range of 0 to MaxPicOrderCntLsb − 2, inclusive.

In reference to the Table 7 and Table 8, offset information used in a process of deriving a POC of a recovery point picture may be represented as a syntax element, recovery_poc_cnt_offset_minus 1. A syntax element, recovery_poc_cnt_offset_minus1, may be represented as an offset value used to derive a POC of a recovery point picture by adding 1 to a value of the recovery_poc_cnt_offset_minus1. A value of recovery_poc_cnt_offset_minus 1 should be within a range from 0 to (MaxPicOrderCntLsb-2).

For example, a syntax element, recovery_poc_cnt_offset_minus1, may be signaled in a SPS. In this case, a syntax element, recovery_poc_cnt_offset_minus1, may be signaled based on a syntax element gdr_enabled_flag representing whether a GDR picture is enabled. When a value of gdr_enabled_flag is 1 (i.e., when a GDR picture is enabled), a syntax element recovery_poc_cnt_offset_minus1 may be signaled in a SPS. When a value of gdr_enabled_flag is 0 (i.e., when a GDR picture is not enabled), a syntax element recovery_poc_cnt_offset_minus1 may not be signaled in a SPS.

In addition, related information used to derive a POC of a recovery point picture based on the offset information (e.g., recovery_poc_cnt_offset_minus1) may be signaled as in the following Table 9.

TABLE 9

| | Descriptor |
|---|---|
| picture_header_structure( ) { | |
| gdr_or_irap_pic_flag | u(1) |
| if( gdr_or_irap_pic_flag ) | |
| gdr_pic_flag | u(1) |
| ... | |
| if( gdr_or_irap_pic_flag ) | |
| no_output_of_prior_pics_flag | u(1) |
| if( gdr_pic_flag ) | |
| recovery_poc_cnt | ue(v) |
| ... | |
| } | |

The following Table 10 represents a semantics for a syntax element included in a syntax table in Table 9.

TABLE 10 recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb − 1, inclusive.
When the current picture is a GDR picture, the variable RpPicOrderCntVal is derived as follows:
    RpPicOrderCntVal = PicOrderCntVal + recovery_poc_cnt +
    recovery_poc_cnt_offset_minus1 + 1 (81)
NOTE 2 - When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

In reference to the Table 9 and Table 10, as related information used to derive a POC of a recovery point picture, a syntax element recovery_poc_cnt may be signaled through a PH. A syntax element recovery_poc_cnt may represent a recovery point of decoded pictures in output order.

For example, when a current picture is a GDR picture, a POC of a recovery point picture may be derived as in an equation of the Table 10 and may be represented as a variable, RpPicOrderCntVal. RpPicOrderCntVal may be derived based on offset information on a POC of a recovery point picture (e.g., recovery_poc_cnt_offset_minus1) and information representing a recovery point POC of a picture in output order (e.g., recovery_poc_cnt). In other words, RpPicOrderCntVal may be derived based on a value obtained by adding (recovery_poc_cnt_offset_minus1+1) to recovery_poc_cnt.

In addition, in an embodiment, in the present disclosure, offset information used in a process of deriving a POC of a recovery point picture (e.g., recovery_poc_cnt_offset_minus1) may be signaled at the same level (e.g., a SPS) that gdr_enabled_flag is signaled as in the Table 7, but may be signaled at a different level (e.g., a PPS).

For example, a syntax element gdr_enabled_flag representing whether a GDR picture is enabled may be signaled in a SPS and a syntax element recovery_poc_cnt_offset_minus1 regarding an offset used to derive a POC of a recovery point picture may be signaled in a PPS. It may be signaled as in the following Table 11 to Table 17.

The following Table 11 represents an example on a method in which a syntax element gdr_enabled_flag representing whether a GDR picture is enabled is signaled through a SPS.

TABLE 11

| | Descriptor |
|---|---|
| seq_parameter_set_rbsp( ) { | |
| ... | |
|   sps_gdr_enabled_flag | u(1) |
| ... | |
| } | |

The following Table 12 represents a semantics for a syntax element included in a syntax table in Table 11.

TABLE 12 sps_gdr_enabled_flag equal to 1 specifies that GDR pictures may be present in CLVSs referring to the SPS.
sps_gdr_enabled_flag equal to 0 specifies that GDR pictures are not present in CLVSs referring to the SPS.

The following Table 13 and Table 14 represents an example on a method in which a syntax element recovery_poc_cnt_offset_minus1 regarding an offset used to derive a POC of a recovery point picture is signaled through a PPS.

TABLE 13

| | Descriptor |
|---|---|
| pic_parameter_set_rbsp( ) { | |
| ... | |
|   pps_gdr_enabled_flag | u(1) |
|   if( pps_gdr_enabled_flag ) | |
|     recovery_poc_cnt_offset_minus1 | ue(v) |
| ... | |
| } | |

TABLE 14

| | Descriptor |
|---|---|
| pic_parameter_set_rbsp( ) { | |
| ... | |
|   if( sps_gdr_enabeld_flag ) | |
|     pps_gdr_enabled_flag | u(1) |
|   if( pps_gdr_enabled_flag ) | |
|     recovery_poc_cnt_offset_minus1 | ue(v) |
| ... | |
| } | |

The following Table 15 represents a semantics for a syntax element included in a syntax table in Table 13 and Table 14.

TABLE 15 pps_gdr_enabled_flag equal to 1 specifies that picture referring to the PPS may be GDR picture. pps_gdr_enabled_flag equal to 0 specifies that no picture referring to the PPS is a GDR picture. When sps_gdr_enabled_flag is equal to 0, the value of pps_gdr_enabled_flag shall be equal to 0.
recovery_poc_cnt_offset_minus1 plus 1 specifies the offset used for deriving the POC of the recovery point picture. The value of recovery_poc_cnt_offset_minus1 shall be in the range of 0 to MaxPicOrderCntLsb − 2, inclusive.

In reference to the Table 11 to Table 15, a syntax element sps_gdr_enabled_flag representing whether a GDR picture is enabled may be signaled through a SPS. In addition, a syntax element recovery_poc_cnt_offset_minus1 regarding an offset used to derive a POC of a recovery point picture may be signaled through a PPS.

In this case, when a GDR picture is not enabled in signaling a syntax element recovery_poc_cnt_offset_minus1, it does not need to perform signaling in a PPS, so signaling may be performed based on information (e.g., pps_gdr_enabled_flag) representing whether a picture referring to a PPS is a GDR picture as in the Table 13 and Table 14.

For example, as in the Table 13, when a value of pps_gdr_enabled_flag is 1 (i.e., when a picture referring to a PPS is a GDR picture), a syntax element recovery_poc_cnt_offset_minus 1 may be signaled in a PPS. Alternatively, as in the Table 14, when a value of sps_gdr_enabeld_flag signaled first in a SPS is 1 (i.e., when a GDR picture is enabled), a syntax element pps_gdr_enabled_flag may be signaled in a PPS and when a value of the pps_gdr_enabled_flag is 1 (i.e., when a picture referring to a PPS is a GDR picture), a syntax element recovery_poc_cnt_offset_minus1 may be signaled in a PPS.

In addition, related information used to derive a POC of a recovery point picture based on the offset information (e.g., recovery_poc_cnt_offset_minus1) may be signaled as in the following Table 16.

TABLE 16

|  | Descriptor |
| --- | --- |
| picture_header_structure( ) { |  |
|   gdr_or_irap_pic_flag | u(1) |
|   if( gdr_or_irap_pic_flag ) |  |
|     gdr_pic_flag | u(1) |
|   ... |  |
|   if( gdr_or_irap_pic_flag ) |  |
|     no_output_of_prior_pics_flag | u(1) |
|   if( gdr_pic_flag ) |  |
|     recovery_poc_cnt | ue(v) |
|   ... |  |
| } |  |

The following Table 17 represents a semantics for a syntax element included in a syntax table in Table 16.

TABLE 17 gdr_pic_flag equal to 1 specifies the picture associated with the PH is a GDR picture.
gdr_pic_flag equal to 0 specifies that the picture associated with the PH is not a GDR picture. When not present, the value of gdr_pic_flag is inferred to be equal to 0. When pps_gdr_enabled_flag is equal to 0, the value of gdr_pic_flag shall be equal to 0.
...
recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb − 1, inclusive.
When the current picture is a GDR picture, the variable RpPicOrderCntVal is derived as follows:
  RpPicOrderCntVal = PicOrderCntVal + recovery_poc_cnt + recovery_poc_cnt_offset_minus1 + 1 (81)
NOTE 2 - When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

In reference to the Table 16 and Table 17, as related information used to derive a POC of a recovery point picture, a syntax element recovery_poc_cnt may be signaled through a PH. A syntax element recovery_poc_cnt may represent a recovery point of decoded pictures in output order.

For example, when a current picture is a GDR picture, a POC of a recovery point picture may be derived as in an equation of the Table 17 and may be represented as a variable, RpPicOrderCntVal. RpPicOrderCntVal may be derived based on offset information on a POC of a recovery point picture (e.g., recovery_poc_cnt_offset_minus1) and information representing a recovery point POC of a picture in output order (e.g., recovery_poc_cnt). In other words, RpPicOrderCntVal may be derived based on a value obtained by adding (recovery_poc_cnt_offset_minus1+1) to recovery_poc_cnt.

The above-described embodiments may be applied to improve a GDR function and gain an effect of clearly distinguishing a POC between a GDR picture and an IRAP picture.

The following drawing was prepared to describe a specific example of the present disclosure. As a name of a specific device or a specific term or name entered in a drawing (e.g., a name, etc. of a syntax/a syntax element) is illustratively proposed, a technical characteristic of the present disclosure is not limited to a specific name used in the following drawing.

FIG. 15 schematically illustrates an example of a video/image encoding method to which embodiment(s) of the present disclosure may be applied. A method disclosed in FIG. 15 may be performed by an encoding apparatus 200 disclosed in FIG. 2.

In reference to FIG. 15, an encoding apparatus may determine a GDR picture and a recovery point picture S1500 and generate GDR-related information S1510.

Here, GDR-related information may include information related to a recovery point. GDR-related information may include information/a syntax element described in the above-described embodiments. GDR-related information may include information representing whether a GDR is enabled, information representing whether a picture is a GDR picture or an IRAP picture, information representing whether a picture is a GDR picture and information representing a recovery point which may represent a POC value by RpPicOrderCntVal. For example, GDR-related information may include at least one of gdr_enabled_flag, gdr_or_irap_pic_flag, gdr_pic_flag, recovery_poc_cnt, recovery_poc_cnt_minus1, recovery_poc_cnt_offset_minus1, sps_gdr_enabled_flag, and/or pps_gdr_enabled_flag.

An encoding apparatus may encode video/image information including GDR-related information S1520. Encoded video/image information may be generated and output in a bitstream.

FIG. 16 schematically illustrates an example of a video/image decoding method to which embodiment(s) of the present disclosure may be applied. A method disclosed in FIG. 16 may be performed by a decoding apparatus 300 disclosed in FIG. 3.

In reference to FIG. 16, a decoding apparatus may acquire video/image information including GDR-related information from a bitstream S1600 and decode a picture based on video/image information S1610.

A picture may be decoded based on video/image information. A picture to be coded may include a GDR picture, a recovery point picture and pictures between a GDR picture and a recovery picture in POC order (output order). In POC order (output order), pictures between a GDR picture and a recovery picture may be referred to as an intermediate picture.

FIG. 17 and FIG. 18 roughly represent an example of a relevant component and a video/image encoding method according to embodiment(s) of the present disclosure.

A method disclosed in FIG. 17 may be performed by an encoding apparatus 200 disclosed in FIG. 2 or FIG. 18. Here, an encoding apparatus 200 disclosed in FIG. 18 roughly represents an encoding apparatus 200 disclosed in FIG. 2. Specifically, S1700~ S1720 in FIG. 17 may be performed by an entropy encoder 240 disclosed in FIG. 2 and according to an embodiment, each step may be performed by an image partitioner 210, a predictor 220, a residual processor 230, an adder 340, etc. In addition, a method disclosed in FIG. 17 may be performed by including the above-described embodiments in the present disclosure. Accordingly, in FIG. 17, a specific description is omitted or is simply performed regarding contents overlapped with the above-described embodiments.

In reference to FIG. 17, an encoding apparatus may derive a recovery point POC (picture order count) for a GDR (gradual decoding refresh) picture S1700.

In an embodiment, an encoding apparatus may determine a GDR picture based on (coded) pictures and determine a recovery point picture for the GDR picture. For example, an encoding apparatus may determine a picture which may start a coding process with a GDR function as a GDR picture and determine a first picture that the whole part of a picture is accurately coded among pictures after the GDR picture as a recovery point picture. And, an encoding apparatus may derive a recovery point POC for a GDR picture based on a POC of the recovery point picture and a POC of the GDR picture.

An encoding apparatus may generate GDR-related information including a syntax element related to a recovery point POC S1710.

A recovery point POC for a GDR picture is information related to a recovery point of (coded) pictures in output order and may be represented based on a syntax element related to a recovery point POC and a POC of a GDR picture. In this case, an encoding apparatus may generate a syntax element related to a recovery point POC and signal it to a decoding apparatus.

In an embodiment, a syntax element related to a recovery point POC may be represented based on a POC difference between a GDR picture and a recovery point picture related to the GDR picture. For example, as described in the Table 5 to Table 6, a syntax element related to a recovery point POC may be represented as a syntax element (e.g., recovery_poc_cnt_minus1) regarding a value obtained by subtracting 1 from a POC difference between a GDR picture and a recovery point picture related to the GDR picture. When an encoding apparatus signals the syntax element (e.g., recovery_poc_cnt_minus1) to a decoding apparatus, a recovery point POC may be derived based on a value obtained by adding 1 to a value of the syntax element (e.g., recovery_poc_cnt_minus1). In an example, when a current picture is a GDR picture, as in an Equation of the Table 6, a recovery point POC (e.g., RpPicOrderCntVal) may be derived based on a value obtained by adding a POC of a GDR picture (e.g., PicOrderCntVal) to (recovery_poc_cnt_minus1+1).

Alternatively, in an embodiment, a syntax element related to a recovery point POC may be represented as a syntax element regarding an offset used to derive a recovery point POC. For example, as described in the Table 7 to Table 17, a syntax element related to a recovery point POC may be represented as an offset syntax element (e.g., recovery_poc_cnt_offset_minus 1) regarding a value obtained by subtracting 1 from an original offset value. When an encoding apparatus signals the offset syntax element (e.g., recovery_poc_cnt_offset_minus 1) to a decoding apparatus, a recovery point POC may be derived based on a value obtained by adding 1 to a value of the offset syntax element (e.g., recovery_poc_cnt_offset_minus1). In an example, when a current picture is a GDR picture, as in an Equation of the Table 10 or Table 17, a recovery point POC (e.g., RpPicOrderCntVal) may be derived based on a value obtained by adding a POC of a GDR picture (e.g., PicOrderCntVal), a POC of a recovery point picture (e.g., recovery_poc_cnt), and (recovery_poc_cnt_offset_minus1+1).

In other words, an encoding apparatus may generate GDR-related information including the syntax element generated based on a recovery point POC. For example, GDR-related information may include a syntax element (e.g., recovery_poc_cnt_minus1) regarding a value obtained by subtracting 1 from a POC difference between a GDR picture and a recovery point picture related to the GDR picture. Alternatively, GDR-related information may include a syntax element (e.g., recovery_poc_cnt_offset_minus1) regarding an offset used to derive a recovery point POC.

As described above, a recovery point POC may be represented based on a syntax element recovery_poc_cnt_minus1 or recovery_poc_cnt_offset_minus1, so a POC of a recovery point picture does not have the same POC as a POC of a GDR picture. In other words, a recovery point picture may be derived based on a POC of a GDR picture and a recovery point POC and in this case, a recovery point picture may not be the same as a GDR picture. Accordingly, when a POC of a GDR picture is derived to be the same as a POC of a recovery point picture, a problem may be resolved that makes a GDR picture the same as an IRAP picture. Accordingly, clear distinction from an IRAP picture may bring about an effect of improving a GDR function.

In addition, according to an embodiment, GDR-related information may include a GDR-enabled flag regarding whether a GDR picture is enabled.

In an embodiment, a GDR-enabled flag, as described in the Table 7, may be represented as a syntax element gdr_enabled_flag and may be included in a SPS (Sequence parameter set). In this case, a syntax element regarding an offset (e.g., recovery_poc_cnt_offset_minus 1) may be signaled in a SPS based on a GDR-enabled flag (e.g., gdr_enabled_flag). For example, when a value of gdr_enabled_flag is 1 (i.e., when a GDR picture is enabled), a syntax element recovery_poc_cnt_offset_minus1 may be signaled in a SPS. When a value of gdr_enabled_flag is 0 (i.e., when a GDR picture is not enabled), a syntax element recovery_poc_cnt_offset_minus1 may not be signaled in a SPS.

Alternatively, in an embodiment, a GDR-enabled flag, as described in the Table 13 or Table 14, may include a GDR-enabled flag (e.g., pps_gdr_enabled_flag) regarding a PPS regarding whether a picture referring to a PPS is a GDR picture, which may be included in a PPS (Picture parameter set). In this case, a syntax element regarding an offset (e.g., recovery_poc_cnt_offset_minus1) may be signaled in a PPS based on a GDR-enabled flag for a PPS (e.g., pps_gdr_enabled_flag). For example, when a value of pps_gdr_enabled_flag is 1 (i.e., when a picture referring to a PPS is a GDR picture), a syntax element recovery_poc_cnt_offset_minus 1 may be signaled in a PPS. When a value of pps_gdr_enabled_flag is 0 (i.e., when a picture referring to a PPS is not a GDR picture), a syntax element recovery_poc_cnt_offset_minus1 may not be signaled in a PPS.

In addition, a GDR-enabled flag for a PPS (e.g., pps_gdr_enabled_flag), as described in the Table 11 and Table 14, may be signaled based on a GDR-enabled flag for a SPS (e.g., sps_gdr_enabled_flag). In this case, a GDR-enabled flag for a PPS (e.g., pps_gdr_enabled_flag) may be signaled in a PPS based on a GDR-enabled flag included in a SPS (e.g., sps_gdr_enabled_flag). And, a syntax element regarding an offset (e.g., recovery_poc_cnt_offset_minus 1) may be signaled in a PPS based on a GDR-enabled flag for a PPS (e.g., pps_gdr_enabled_flag). For example, when a value of sps_gdr_enabeld_flag signaled first in a SPS is 1 (i.e., when a GDR picture is enabled), a syntax element pps_gdr_enabled_flag may be signaled in a PPS and subsequently, according to whether a value of the pps_gdr_enabled_flag is 0 or 1, a syntax element recovery_poc_cnt_offset_minus 1 may be signaled or not in a PPS.

An encoding apparatus may encode video/image information including GDR-related information S1720.

For example, an encoding apparatus may generate GDR-related information including at least one of the above-described syntax element recovery_poc_cnt_minus1, recovery_poc_cnt_offset_minus 1, gdr_enabled_flag, sps_gdr_enabled_flag, pps_gdr_enabled_flag and encode image/video information including the GDR-related information. In addition, an encoding apparatus may generate a variety of information derived in an encoding process as image/video information and perform encoding by including such a variety of information.

Image/video information including a variety of information as described above may be encoded and output in a form of a bitstream. A bitstream may be transmitted to a decoding apparatus through a network or a (digial) storage medium. Here, a network may include a radio network and/or a communications network, etc. and a digital storage medium may include a variety of storage media such as USB, SD, CD, DVD, blu-ray, HDD, SSD, etc.

FIG. 19 and FIG. 20 roughly represent an example of a relevant component and a video/image decoding method according to embodiment(s) of the present disclosure.

A method disclosed in FIG. 19 may be performed by a decoding apparatus 300 disclosed in FIG. 3 or FIG. 20. Here, a decoding apparatus 300 disclosed in FIG. 20 roughly represents a decoding apparatus 300 disclosed in FIG. 3. Specifically, S1900~S1920 in FIG. 19 may be performed by an entropy decoder 310 disclosed in FIG. 3 and according to an embodiment, each step may be performed by a residual processor 320, a predictor 330, an adder 340, etc. disclosed in FIG. 3. In addition, a method disclosed in FIG. 19 may be performed by including embodiments which are described in the present disclosure. Accordingly, in FIG. 19, a specific description is omitted or is simply performed regarding contents overlapped with the above-described embodiments.

In reference to FIG. 19, a decoding apparatus may obtain image/video information including GDR (gradual decoding refresh) related information from a bitstream $1900.

In an embodiment, a decoding apparatus may derive information necessary for image restoration (or picture restoration) (ex. video/image information) by parsing a bitstream. In other words, image/video information may include a variety of information needed in a decoding process and may be decoded based on a coding method such as Exponential Golomb Coding, CAVLC or CABAC, etc.

For example, image/video information may include GDR-related information. GDR-related information may include information/syntax elements related to derive a recovery point POC for a GDR picture. For example, GDR-related information may include at least one of the above-described syntax element recovery_poc_cnt_minus1, recovery_poc_cnt_offset_minus 1, gdr_enabled_flag, sps_gdr_enabled_flag, pps_gdr_enabled_flag.

A decoding apparatus may derive a recovery point POC for a GDR picture based on GDR-related information S1910.

A recovery point POC for a GDR picture is information related to a recovery point of (decoded) pictures in output order and may be derived based on a syntax element related to a recovery point POC and a POC of a GDR picture. In other words, a decoding apparatus may acquire a syntax element related to a recovery point POC from a bitstream and based on it, may derive a recovery point POC for a GDR picture.

In an embodiment, a syntax element related to a recovery point POC may be information represented based on a POC difference between a GDR picture and a recovery point picture related to the GDR picture. For example, as described in the Table 5 to Table 6, a syntax element related to a recovery point POC may be a syntax element (e.g., recovery_poc_cnt_minus1) regarding a value obtained by subtracting 1 from a POC difference between a GDR picture and a recovery point picture related to the GDR picture. When a decoding apparatus receives the syntax element (e.g., recovery_poc_cnt_minus1) from a bitstream, a recovery point POC may be derived based on a value obtained by adding 1 to a value of the syntax element (e.g., recovery_poc_cnt_minus1). In an example, when a current picture is a GDR picture, as in an Equation of the Table 6, a recovery point POC (e.g., RpPicOrderCntVal) may be derived based on a value obtained by adding a POC of a GDR picture (e.g., PicOrderCntVal) to (recovery_poc_cnt_minus1+1).

Alternatively, in an embodiment, a syntax element related to a recovery point POC may be information represented based on an offset used to derive a recovery point POC. For example, as described in the Table 7 to Table 17, a syntax element related to a recovery point POC may be an offset syntax element (e.g., recovery_poc_cnt_offset_minus 1) regarding a value obtained by subtracting 1 from an original offset value. When a decoding apparatus receives a syntax element regarding the offset (e.g., recovery_poc_cnt_offset_minus1) from a bitstream, a recovery point POC may be derived based on a value obtained by adding 1 to a value of a syntax element regarding the offset (e.g., recovery_poc_cnt_offset_minus1). In an example, when a current picture is a GDR picture, as in an Equation of the Table 10 or Table 17, a recovery point POC (e.g., RpPicOrderCntVal) may be derived based on a value obtained by adding a POC of a GDR picture (e.g., PicOrderCntVal), a POC of a recovery point picture (e.g., recovery_poc_cnt), and (recovery_poc_cnt_offset_minus1+1).

As described above, a recovery point POC may be derived based on a syntax element recovery_poc_cnt_minus1 or recovery_poc_cnt_offset_minus1, so a POC of a recovery point picture does not have the same POC as a POC of a GDR picture. In other words, a recovery point picture may be derived based on a POC of a GDR picture and a recovery point POC and in this case, a recovery point picture may not be the same as a GDR picture. Accordingly, when a POC of a GDR picture is derived to be the same as a POC of a recovery point picture, a problem may be resolved that makes a GDR picture the same as an IRAP picture.

Accordingly, clear distinction from an IRAP picture may bring about an effect of improving a GDR function.

In addition, according to an embodiment, GDR-related information may include a GDR-enabled flag regarding whether a GDR picture is enabled.

In an embodiment, a GDR-enabled flag, as described in the Table 7, may be represented as a syntax element gdr_enabled_flag and may be included in a SPS (Sequence parameter set). In this case, a syntax element regarding an offset (e.g., recovery_poc_cnt_offset_minus1) may be signaled/parsed in a SPS based on a GDR-enabled flag (e.g., gdr_enabled_flag). For example, a decoding apparatus may receive image information including a GDR-enabled flag (e.g., gdr_enabled_flag) and derive a recovery point POC by obtaining a syntax element regarding an offset (e.g., recovery_poc_cnt_offset_minus1) based on a value of a GDR-enabled flag (e.g., gdr_enabled_flag). In other words, when a value of gdr_enabled_flag is 1 (i.e., when a GDR picture is enabled), a syntax element recovery_poc_cnt_offset_minus1 may be signaled/parsed in a SPS. When a value of gdr_enabled_flag is 0 (i.e., when a GDR picture is not enabled), a syntax element recovery_poc_cnt_offset_minus may not be signaled/parsed in a SPS.

Alternatively, in an embodiment, a GDR-enabled flag, as described in the Table 13 or Table 14, may include a GDR-enabled flag (e.g., pps_gdr_enabled_flag) regarding a PPS regarding whether a picture referring to a PPS is a GDR picture, which may be included in a PPS (Picture parameter set). In this case, a syntax element regarding an offset (e.g., recovery_poc_cnt_offset_minus 1) may be signaled/parsed in a PPS based on a GDR-enabled flag for a PPS (e.g., pps_gdr_enabled_flag). For example, a decoding apparatus may receive image information including a GDR-enabled flag for a PPS (e.g., pps_gdr_enabled_flag) and derive a recovery point POC by obtaining a syntax element regarding an offset (e.g., recovery_poc_cnt_offset_minus 1) based on a value of a GDR-enabled flag for a PPS (e.g., pps_gdr_enabled_flag). In other words, when a value of pps_gdr_enabled_flag is 1 (i.e., when a picture referring to a PPS is a GDR picture), a syntax element recovery_poc_cnt_offset_minus 1 may be signaled/parsed in a PPS. When a value of pps_gdr_enabled_flag is 0 (i.e., when a picture referring to a PPS is not a GDR picture), a syntax element recovery_poc_cnt_offset_minus1 may not be signaled/parsed in a PPS.

In addition, a GDR-enabled flag for a PPS (e.g., pps_gdr_enabled_flag), as described in the Table 11 and Table 14, may be signaled/parsed based on a GDR-enabled flag included in a SPS (e.g., sps_gdr_enabled_flag). In this case, a GDR-enabled flag for a PPS (e.g., pps_gdr_enabled_flag) may be signaled/parsed in a PPS based on a GDR-enabled flag included in a SPS (e.g., sps_gdr_enabled_flag). And, a syntax element regarding an offset (e.g., recovery_poc_cnt_offset_minus1) may be signaled/parsed in a PPS based on a GDR-enabled flag for a PPS (e.g., pps_gdr_enabled_flag). For example, when a value of sps_gdr_enabeld_flag signaled first in a SPS is 1 (i.e., when a GDR picture is enabled), a syntax element pps_gdr_enabled_flag may be signaled/parsed in a PPS and subsequently, according to whether a value of the pps_gdr_enabled_flag is 0 or 1, a syntax element recovery_poc_cnt_offset_minus 1 may be signaled/parsed or not in a PPS.

A decoding apparatus may determine output for pictures related to a GDR picture based on a recovery point POC S1920.

In an embodiment, a decoding apparatus may determine a value of an output flag related to whether to ouput pictures having a POC from the POC of the GDR picture to before the recovery point POC in a POC order. For example, (decoded) pictures between a GDR picture and a recovery point picture may be determined not to be output and in this case, a value of the output flag (e.g., NoOutputBeforeRecoveryFlag) may be configured as 1. In addition, a (decoded) GDR picture may be also determined not to be output and in this case, a value of the output flag (e.g., NoOutputBeforeRecoveryFlag) may be set as 1. But, a (decoded) recovery point picture may be determined to be output and in this case, a value of the output flag (e.g., NoOutputBeforeRecoveryFlag) may be set as 0. In other words, for pictures having a POC from a POC of a GDR picture to before a recovery point POC, a decoding apparatus may determine a value of the output flag (e.g., NoOutputBeforeRecoveryFlag) as 1.

And, a decoding apparatus may set a GDR picture that a value of the output flag (e.g., NoOutputBeforeRecoveryFlag) is 1 or a picture having a POC before the recovery point POC and having a value of the output flag (e.g., NoOutputBeforeRecoveryFlag) being 1 (i.e., pictures having a value of the output flag (e.g., NoOutputBeforeRecoveryFlag) being 1 and having a POC from a POC of a GDR picture to before a recovery point POC) not to be needed for output. For example, for the pictures set not to be needed for output, a value of PictureOutputFlag may be set as 0.

Alternatively, a decoding apparatus may set a (decoded) recovery point picture having a value of the output flag (e.g., NoOutputBeforeRecoveryFlag) being 0 to be needed for output. For example, for the picture set to be needed for output, a value of PictureOutputFlag may be set as 1.

In this case, when PictureOutputFlag is 1, a (decoded) current picture may be output in output order or in POC order. Alternatively, when PictureOutputFlag is 0, a (decoded) current picture is not output.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in an apparatus for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information (e.g., information on instructions) for implementation or an algorithm may be stored in a digital storage medium.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an over the top (OTT) video device, an Internet streaming service providing device, a three-dimensional (3D) video device, a virtual reality (VR) device, an argumente reality (AR) device, a video telephony video device, a transportation terminal (e.g., vehicle (including autonomous vehicle) terminal, airplane terminal, ship terminal, etc.), and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the embodiments of the present disclosure may be embodied as a computer program product by program codes, and the program codes may be executed on a computer by the embodiments of the present disclosure. The program codes may be stored on a computer-readable carrier.

FIG. 21 illustrates an example of a content streaming system to which embodiments disclosed in the present disclosure is applicable.

Referring to FIG. 21, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted.

The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD), a digital TV, a desktop computer, a digital signage or the like.

Each of servers in the contents streaming system may be operated as a distributed server, and in this case, data received by each server may be processed in distributed manner. The claims described herein may be combined in various ways. For example, the technical features of the method claims of the present specification may be combined to be implemented as an apparatus, and the technical features of the apparatus claims of the present specification may be combined to be implemented as a method. In addition, the technical features of the method claims of the present specification and the technical features of the apparatus claims may be combined to be implemented as an apparatus, and the technical features of the method claims of the present specification and the technical features of the apparatus claims may be combined to be implemented as a method.

The invention claimed is:

1. An image decoding method performed by a decoding apparatus, the method comprising:
   obtaining image information including gradual decoding refresh (GDR) related information from a bitstream;
   deriving a recovery point POC (picture order count) for a GDR picture based on the GDR related information; and
   determining output for pictures related to the GDR picture based on the recovery point POC,
   wherein the GDR related information includes a syntax element related to the recovery point POC,
   wherein the recovery point POC is derived based on a POC of the GDR picture and the syntax element related to the recovery point POC,
   wherein the syntax element related to the recovery point POC is a syntax element related to a value obtained by subtracting 1 from a POC difference between the GDR picture and the recovery point picture related to GDR picture, and
   wherein the recovery point POC is derived based on a value obtained by adding 1 to the value of the syntax element.

2. The image decoding method of claim 1, wherein a recovery point picture is derived based on the POC of the GDR picture and the recovery point POC, and
   wherein the recovery point picture is not the same as the GDR picture.

3. The image decoding method of claim 1, wherein determining the output for the pictures related to the GDR picture comprises:
   determining a value of an output flag related to whether to output pictures having a POC from the POC of the GDR picture to before the recovery point POC in a POC order.

4. The image decoding method of claim 3, wherein the GDR picture having the output flag equal to 1 or a picture having a POC before the recovery point POC and having the output flag equal to 1 is set not to be needed for output.

5. An image encoding method performed by an encoding apparatus, the method comprising:
   deriving a recovery point POC (picture order count) for a gradual decoding refresh (GDR) picture;
   generating GDR related information including a syntax element related to the recovery point POC; and
   encoding image information including the GDR related information,
   wherein the recovery point POC is represented based on a POC of the GDR picture and the syntax element related to the recovery point POC,
   wherein the syntax element related to the recovery point POC is a syntax element related to a value obtained by subtracting 1 from a POC difference between the GDR picture and the recovery point picture related to the GDR picture, and
   wherein the recovery point POC is derived based on a value obtained by adding 1 to the value of the syntax element.

6. The image encoding method of claim 5, wherein a recovery point picture is derived based on the POC of the GDR picture and the recovery point POC, and
   wherein the recovery point picture is not the same as the GDR picture.

* * * * *